(12) United States Patent
Zhang et al.

(10) Patent No.: US 8,824,325 B2
(45) Date of Patent: *Sep. 2, 2014

(54) POSITIONING TECHNIQUE FOR WIRELESS COMMUNICATION SYSTEM

(75) Inventors: Xiaoxin Zhang, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/315,174

(22) Filed: Dec. 8, 2011

(65) Prior Publication Data
US 2013/0148514 A1 Jun. 13, 2013

(51) Int. Cl.
  G01S 5/02 (2010.01)
  G01S 5/14 (2006.01)
  G01S 13/87 (2006.01)

(52) U.S. Cl.
  CPC ............... G01S 5/0257 (2013.01); *G01S 5/14* (2013.01); *G01S 13/876* (2013.01); *G01S 5/021* (2013.01)
  USPC .................. 370/252; 455/456.1; 342/125

(58) Field of Classification Search
  USPC ........................................................ 342/450
  See application file for complete search history.

(56) References Cited

U.S. PATENT DOCUMENTS

| | | | |
|---|---|---|---|
| 6,034,635 A | 3/2000 | Gilhousen | |
| 6,166,685 A | 12/2000 | Soliman | |
| 6,266,014 B1 * | 7/2001 | Fattouche et al. | 342/450 |
| 6,420,999 B1 | 7/2002 | Vayanos | |
| 6,618,005 B2 | 9/2003 | Hannah et al. | |
| 6,744,398 B1 | 6/2004 | Pyner et al. | |
| 7,257,412 B2 * | 8/2007 | Chen et al. | 455/456.1 |
| 7,289,813 B2 | 10/2007 | Karaoguz | |

(Continued)

FOREIGN PATENT DOCUMENTS

| | | | |
|---|---|---|---|
| WO | 2012170046 A1 | 12/2012 | |
| WO | 2012170062 A1 | 12/2012 | |

(Continued)

OTHER PUBLICATIONS

Shen, G., et al., "Performance comparison of TOA and TDOA based location estimation algorithms in LOS environment", (WPNC '08) 5th, IEEE, Mar. 27, 2008, pp. 71-78, XP031247832, ISBN: 978-1-4244-1798-8 Section II (TOA Based Location Estimation Algorithms}: "C. Taylor Series Method".*

(Continued)

*Primary Examiner* — Joseph Bednash
(74) *Attorney, Agent, or Firm* — DeLizio Gilliam, PLLC

(57) ABSTRACT

A hybrid positioning system can be implemented to improve location estimation of a wireless network device when reference network devices can have different distance calibration constants. For each of a plurality of positions at which the wireless network device is placed and for each reference network device, a distance between the wireless network device and the reference network device is determined. A first positioning algorithm is executed to determine an intermediate location (corresponding to each position) of the wireless network device and a distance calibration constant for each reference network device based, in part, on a corresponding initial location of the wireless network device. A second positioning algorithm is executed to estimate a subset of the positions of the wireless network device based on the intermediate location (corresponding to the position) of the wireless network device and the distance calibration constant of each of reference network devices.

22 Claims, 7 Drawing Sheets

(56) References Cited

U.S. PATENT DOCUMENTS

| | | |
|---|---|---|
| 8,489,114 B2 | 7/2013 | Zhang |
| 2001/0053699 A1 | 12/2001 | McCrady et al. |
| 2002/0155845 A1 | 10/2002 | Martorana |
| 2002/0196184 A1 | 12/2002 | Johnson et al. |
| 2003/0134647 A1 | 7/2003 | Santhoff et al. |
| 2004/0008138 A1 | 1/2004 | Hockley et al. |
| 2004/0147269 A1 | 7/2004 | Kim |
| 2004/0258012 A1 | 12/2004 | Ishii |
| 2004/0264407 A1 | 12/2004 | Tang et al. |
| 2005/0135257 A1 | 6/2005 | Stephens et al. |
| 2006/0030350 A1 | 2/2006 | Mitchell |
| 2007/0121560 A1 | 5/2007 | Edge |
| 2007/0296633 A1 | 12/2007 | Yanagihara |
| 2008/0103696 A1 | 5/2008 | Cheok et al. |
| 2008/0125161 A1 | 5/2008 | Ergen et al. |
| 2008/0130604 A1 | 6/2008 | Boyd |
| 2008/0188236 A1 | 8/2008 | Alles et al. |
| 2008/0248741 A1 | 10/2008 | Alizadeh-Shabdiz |
| 2008/0287139 A1 | 11/2008 | Carlson et al. |
| 2009/0280825 A1 | 11/2009 | Malik et al. |
| 2010/0130225 A1 | 5/2010 | Alles et al. |
| 2010/0135178 A1 | 6/2010 | Aggarwal et al. |
| 2010/0150117 A1 | 6/2010 | Aweya et al. |
| 2011/0059752 A1 | 3/2011 | Garin et al. |
| 2011/0117925 A1 | 5/2011 | Sampath et al. |
| 2011/0136506 A1 | 6/2011 | Stewart |
| 2011/0143811 A1 | 6/2011 | Rodriguez |
| 2011/0188389 A1 | 8/2011 | Hedley et al. |
| 2011/0244881 A1 | 10/2011 | Bando et al. |
| 2011/0304506 A1 | 12/2011 | Choi |
| 2012/0087272 A1 | 4/2012 | Lemkin et al. |
| 2012/0314587 A1 | 12/2012 | Curticapean |
| 2012/0315919 A1 | 12/2012 | Hirsch |
| 2013/0005347 A1 | 1/2013 | Curticapean |
| 2013/0072217 A1 | 3/2013 | Zhang et al. |
| 2013/0072218 A1 | 3/2013 | Zhang et al. |
| 2013/0072219 A1 | 3/2013 | Zhang et al. |
| 2013/0072220 A1 | 3/2013 | Zhang et al. |
| 2013/0100850 A1 | 4/2013 | Zhang et al. |
| 2013/0101173 A1 | 4/2013 | Holeva et al. |

FOREIGN PATENT DOCUMENTS

| | | |
|---|---|---|
| WO | 2013002812 A2 | 1/2013 |
| WO | 2013043664 | 3/2013 |
| WO | 2013043675 | 3/2013 |
| WO | 2013043681 | 3/2013 |
| WO | 2013043685 | 3/2013 |
| WO | 2013059636 A1 | 4/2013 |
| WO | 2013086393 | 6/2013 |

OTHER PUBLICATIONS

Foy, W.H., "Position-Location Solutions by Taylor-Series Estimation", IEEE Transactions on Aerospace and Electronic Systems, IEEE Service Center, Piscataway, N J, US, vol. AES-10, No. 2,Mar. 1, 1976, pp. 187-194, XP011166129, ISSN: 0018-9251.*
PCT Application No. PCT/US2011/046074 International Preliminary Report on Patentability, Jun. 27, 2013 , 11 pages.
U.S. Appl. No. 13/278,642 Office Action, Jul. 19, 2013.
PCT Application No. PCT/US2011/043781 International Preliminary Report on Patentability, Jun. 7, 2013 , 4 pages.
PCT Application No. PCT/US2012/061081 International Search Report, Mar. 27, 2013 , 11 pages.
U.S. Appl. No. 13/155,037 Office Action, Apr. 3, 2013 , 20 pages.
U.S. Appl. No. 13/236,172 Office Action, Jan. 3, 2013 , 25 pages.
PCT Application No. PCT/US2011/054977 International Preliminary Report on Patentability, Jun. 10, 2013, 8 pages.
Co-pending U.S. Appl. No. 13/155,037, filed Jun. 7, 2011.
Co-pending U.S. Appl. No. 13/158,029, filed Jun. 10, 2011.
Co-pending U.S. Appl. No. 13/170,353, filed Jun. 28, 2011.
Co-pending U.S. Appl. No. 13/236,172, filed Sep. 19, 2011.
Co-pending U.S. Appl. No. 13/236,208, filed Sep. 19, 2011.
Co-pending U.S. Appl. No. 13/236,232, filed Sep. 19, 2011.
Co-pending U.S. Appl. No. 13/236,259, filed Sep. 19, 2011.
Co-pending U.S. Appl. No. 13/278,642, filed Oct. 21, 2011.
U.S. Appl. No. 13/158,029 Office Action, Oct. 3, 2012 , 18 pages.
U.S. Appl. No. 13/236,172 Office Action, Jun. 7, 2012, 25 pages.
U.S. Appl. No. 13/236,232 Office Action, Oct. 11, 2012, 13 pages.
U.S. Appl. No. 13/236,208 Office Action, Nov. 7, 2012 , 14 pages.
International Search Report and Written Opinion—PCT/054977—ISA/EPO, Jan. 31, 2012 , 7 pages.
PCT Application No. PCT/US11/43781 International Search Report, Nov. 17, 2011 , 7 pages.
PCT Application No. PCT/US11/46074 International Search Report, Dec. 16, 2011 , 10 pages.
PCT Application No. PCT/US11/54977 International Search Report, Jan. 31, 2012 , 7 pages.
Foy, W.H., "Position-Location Solutions by Taylor-Series Estimation", IEEE Transactions on Aerospace and Electronic Systems, IEEE Service Center, Piscataway, NJ, US, vol. AES-10, No. 2,Mar. 1, 1976, pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, NJ, US, vol. 5, No. 8, Aug. 1, 2001, pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10th International Conference on, IEEE, Sep. 1, 2011, pp. 104-110, XP932136955, DOI : 10.1109/ CIS.2011.6169143 ISBN: 978-1-4673-0687-4 Abstract Sections I-III.
Yu, K et al., "TOA-based distributed localisation with unknown internal delays and clock frequency offsets in wireless sensor networks", IET Signal Processing vol. 3, No. 2 XP006032603, ISSN: 1751-9683, 001: 10.1049|1ET-SPR:20080029 Mar. 2, 2009 , 106-118.
Gholami, Mohammad R. et al., "Positioning algorithms for cooperative networks in the presence of an unknown turn-around time", 2011 IEEE 12th Workshop on Signal Processing Advancesin Wireless Communications (SPAWC 2011) IEEE Piscataway,NJ, USA, IEEE, Piscataway, NJ, USA, XP032035718, 001: 10.11 09/SPAWC.2011. 5990386; ISBN: 978-1-4244-9333-3 Jun. 26, 2011 , 166-170.
PCT/US2012/056046 International Search Report, Jan. 3, 2013 , 13 pages.
PCT Application No. PCT/US2012/068543 International Search Report, Feb. 15, 2013 , 15 pages.
PCT Application No. PCT/US2012/056036 International Search Report, Jan. 3, 2013 , 13 pages.
PCT Application No. PCT/US12/56053 International Search Report, Jan. 3, 2013 , 13 pages.
PCT Application No. PCT/US12/56017 International Search Report, Jan. 3, 2013 , 14 pages.
PCT Application No. PCT/US12/56017 International Preliminary Report on Patentability, Dec. 20, 2013, 11 pages.
PCT Application No. PCT/US2012/056036 International Preliminary Report on Patentability, Dec. 20, 2013 , 10 pages.
PCT Application No. PCT/US2012/056046 International Preliminary Report on Patentability, Dec. 20, 2013 , 9 pages.
PCT Application No. PCT/US2012/056053 International Preliminary Report on Patentability, Dec. 20, 2013 , 10 pages.
PCT Application No. PCT/US2012/061081 International Preliminary Report on Patentabililty, Sep. 13, 2013 , 6 pages.
PCT Application No. PCT/US2012/056017 Written Opinion of IPEA, Oct. 1, 2013 , 9 pages.
PCT Application No. PCT/US2012/056036 Written Opinion of IPEA, Oct. 1, 2013 , 8 pages.
PCT Application No. PCT/US2012/056046 Written Opinion of IPEA, Oct. 1, 2013 , 7 pages.
PCT Application No. PCT/US2012/056053 Written Opinion of IPEA, Oct. 1, 2013 , 8 pages.
PCT Application No. PCT/US2012/068543 Written Opinion of IPEA, Dec. 4, 2013, 7 pages.

* cited by examiner

POSITIONING TECHNIQUE FOR WIRELESS COMMUNICATION SYSTEM

BACKGROUND

Embodiments of the inventive subject matter generally relate to the field of wireless communication and, more particularly, to a hybrid positioning technique for a wireless communication system.

A wireless communication device can use various position estimation techniques to determine an unknown location of the wireless communication device based on communicating with a plurality of reference wireless communication devices with known locations. For example, the wireless communication device can employ time of arrival (TOA) positioning techniques that use the travel time of radio signals from the wireless communication device to the reference wireless communication devices to determine the unknown location. As another example, the wireless communication device can employ time difference of arrival (TDOA) positioning techniques that use the difference between the travel times of radio signals from the wireless communication device to a plurality of the reference wireless communication devices to determine the unknown location.

SUMMARY

Various embodiments of a hybrid positioning technique for wireless communication systems are disclosed. In one embodiment, at each of a plurality of positions at which a wireless network device of a communication network is placed and for each of a plurality of reference wireless network devices of the communication network, a distance between the wireless network device and the reference wireless network device is determined. An initial location of the wireless network device is calculated based, at least in part, on a location of each of the plurality of reference wireless network devices. A first set of positioning computations is executed for determining an intermediate location of the wireless network device associated with each of the plurality of positions at which the wireless network device is placed and for determining a target distance calibration constant associated with each of the plurality of reference wireless network devices based, at least in part, on the initial location of the wireless network device and the distance between each of the plurality of positions associated with the wireless network device and each of the plurality of reference wireless network devices. For each of one or more of the plurality of positions associated with the wireless network device, a second set of positioning computations is iteratively executed for estimating the position of the wireless network device based, at least in part, on the intermediate location of the wireless network device associated with the position of the wireless network device and the distance calibration constant associated with each of the plurality of reference wireless network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
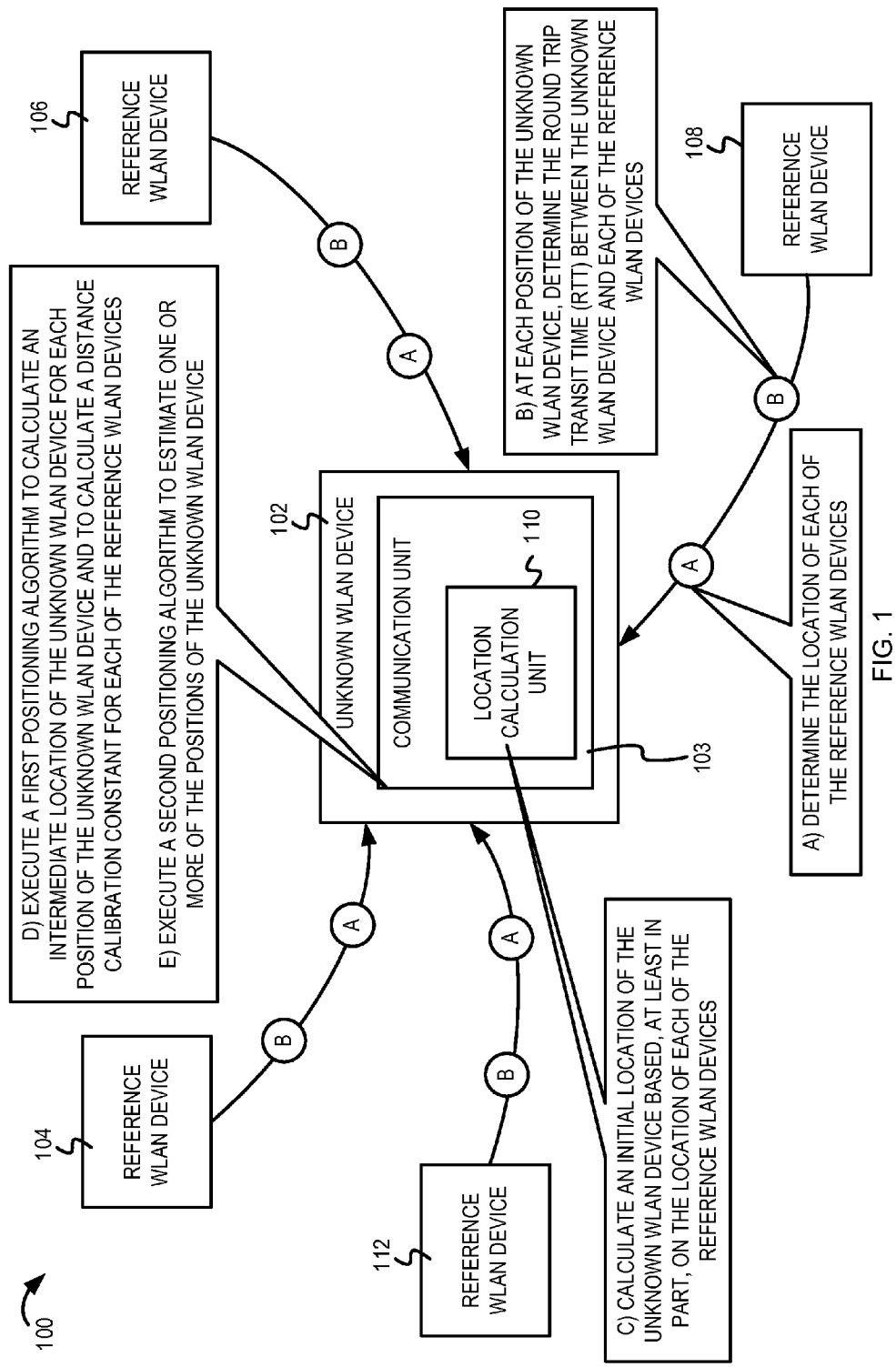
FIG. 1 is an example block diagram illustrating a mechanism for determining the unknown location of a network device in a wireless communication network.

The description that follows includes exemplary systems, methods, techniques, instruction sequences, and computer program products that embody techniques of the present inventive subject matter. However, it is understood that the described embodiments may be practiced without these specific details. For instance, although examples refer to wireless local area network (WLAN) devices executing the position estimation techniques described herein, embodiments are not so limited. In other embodiments, various other devices and standards (e.g., WiMAX) can execute the position estimation techniques. In other instances, well-known instruction instances, protocols, structures, and techniques have not been shown in detail in order not to obfuscate the description.

A network device associated with an unknown location ("unknown network device") typically uses a TDOA based positioning algorithm or a TOA based positioning algorithm to determine its location based on a plurality of reference network devices. A conventional TDOA positioning algorithm typically uses, as one of its inputs, an arbitrarily selected distance calibration constant for each of the reference network devices to iteratively calculate the location of the unknown network device. Depending on the implementation, the conventional TOA positioning algorithm may or may not require an accurately known distance calibration constant to estimate the location of the unknown network device. A first TOA positioning system is typically not sensitive to the distance calibration constant and may utilize an arbitrarily selected distance calibration constant (for each of the reference network devices) for positioning calculations. The first TOA positioning system that can utilize the arbitrarily selected distance calibration constant for each of the reference network devices is referred to herein as "TOA1 positioning system." A second TOA positioning system referred to herein as "TOA2 positioning system" is typically sensitive to the distance calibration constant for each of the reference network devices and may not utilize an arbitrarily selected distance calibration constant for positioning calculations. As part of the conventional TDOA positioning system and the conventional TOA1 positioning system, it is typically assumed that the distance calibration constant associated with each of the reference network devices is identical or exactly the same. However, in a practical operating environment, the distance calibration constants for different reference network devices are different. Assuming identical distance calibration constants across all of the reference network devices can degrade the performance of the conventional TDOA positioning system or the conventional TOA1 positioning system.

This can result in the conventional TDOA positioning algorithm (or the conventional TOA1 positioning system) not converging to an appropriate solution (i.e., the location of the unknown network device). Furthermore, as described above, the conventional TOA2 positioning system typically requires knowledge of the distance calibration constants for all the reference network devices. Not knowing or randomly selecting the distance calibration constants associated with the reference network devices can result in poor performance of the conventional TOA2 positioning algorithm, can result in the conventional TOA2 positioning algorithm not converging to the appropriate location of the unknown network device, and/or can result in the conventional TOA2 positioning algorithm converging to the wrong solution.

A hybrid positioning system employing a combination of the TDOA positioning system, the TOA1 positioning system, and/or the TOA2 positioning system can be implemented to estimate the distance calibration constant for each of the reference network devices (when each of the reference network devices have distinct distance calibration constants) and to estimate the location of the unknown network device. The unknown network device can be moved to a plurality of different positions to ensure that a sufficient number of equations are available to determine the distance calibration constant associated with each of the reference network devices and to estimate the location of the unknown network device. At each position of the unknown network device, a round-trip transit time (RTT) associated with (and the corresponding distance to) each of the reference network devices is determined. Next, a first positioning system can be executed to determine an estimate of the intermediate location of the unknown WLAN device (at each position of the unknown WLAN device). The first positioning system can also be executed to determine an estimate of the distance calibration constant for each of the reference network devices based, at least in part, on the estimate of the intermediate location of the unknown WLAN device (at each position of the unknown WLAN device). The operations of the first positioning system can be iteratively executed to estimate the intermediate location of the unknown WLAN device (at each position of the unknown WLAN device) and to estimate the distance calibration constant for each of the reference network devices until the desired accuracy is achieved or a predetermined number of iterations are executed. The last estimate of the intermediate location (at each position) of the unknown WLAN device and the last estimate of the distance calibration constant ("target distance calibration constant") for each of the reference network devices can be employed by a second positioning system to determine a more accurate estimate of one or more of the plurality of positions of the unknown network device. Such a hybrid positioning technique for utilizing the first positioning system to determine the intermediate location (at each position) of the unknown WLAN device and to determine the distance calibration constant associated with each reference WLAN device, and for utilizing the second positioning system to determine a more accurate estimate of one or more positions of the unknown WLAN device can minimize the position estimation error, increase positioning accuracy and improve performance gain, consequently improving the overall performance of the unknown network device.

FIG. 1 is an example block diagram illustrating a mechanism for determining the unknown location of a network device in a wireless communication network 100. The wireless communication network 100 comprises a WLAN device 102 with an unknown location ("unknown WLAN device") and four reference WLAN devices 104, 106, 108, and 112.

The unknown WLAN device 102 comprises a communication unit 103. The communication unit 103 comprises a location calculation unit 110. The communication unit 103 of the unknown WLAN device 102 can implement protocols and functionality to enable WLAN communication in the wireless communication network 100. It is noted that although not depicted in FIG. 1, in some embodiments one or more of the reference WLAN devices 104, 106, 108, and 112 can also comprise a location calculation unit and corresponding functionality for determining their respective location (i.e., when their location is unknown). In some implementations, the unknown WLAN device 102 and the reference WLAN devices 104, 106, 108, and 112 can each be various types of electronic devices, such as a laptop computer, a tablet computer, a gaming console, a mobile phone, a smart appliance, an access point, or suitable electronic devices comprising wireless communication capabilities. In some embodiments, in addition to WLAN communication protocols, the communication unit 103 can implement other protocols and functionality to enable other types of communications (e.g., Bluetooth®, Ethernet, WiMAX, powerline communications, etc.).

At stage A, the location calculation unit 110 determines the location of each of the reference WLAN devices 104, 106, 108, and 112. In some implementations, the location calculation unit 110 can request and receive location coordinates associated with each of the reference WLAN devices 104, 106, 108, and 112. For example, the location calculation unit 110 can transmit a request for the location coordinates in RTT control messages (described in stage B), and can then receive the location coordinates in corresponding response control messages. As another example, the location calculation unit 110 can transmit a location request message (distinct from the RTT control messages) to each of the reference WLAN devices, and can then receive a corresponding location response message comprising the location coordinates associated with each of the reference WLAN devices. In another implementation, the location calculation unit 110 can query a centralized server (or can access a predetermined memory location) to determine the location coordinates associated with the reference WLAN devices 104, 106, 108, and 112. In another implementation, the reference WLAN devices 104, 106, 108, and 112 may broadcast their respective location coordinates at periodic intervals (e.g., in a beacon message or another suitable control message). The location calculation unit 110 can determine the location coordinates associated with the reference WLAN devices 104, 106, 108, and 112 based on receiving and analyzing the periodically received messages. As part of the location coordinates, the location calculation unit 110 can determine two-dimensional (2-D) coordinates (e.g., X and Y coordinates), three-dimensional (3-D) coordinates (e.g., X, Y, and Z coordinates), latitudes and longitudes, spherical coordinates, and/or other suitable location indicators. The location calculation unit 110 can execute the operations described below in stages B-C at each of a plurality of positions of the unknown WLAN device 102. In other words, as will be further described below, the location calculation unit 110 can execute the operations of stages B-C at a first position of the unknown WLAN device 102. Next, the unknown WLAN device 102 can be moved to a second position and the location calculation unit 110 can execute the operations described in stages B-C at the second location of the unknown WLAN device 102. The location calculation unit 110 can then execute the operations described in stages D-E to estimate the current position (and/or one or more previous positions) of the unknown WLAN device 102.

At stage B, at each of the plurality of positions of the unknown WLAN device 102, the location calculation unit 110 determines the round trip transit time (RTT) between the unknown WLAN device 102 and each of the reference WLAN devices 104, 106, 108, and 112 in the wireless communication network 100. In one implementation, the location calculation unit 110 can transmit one or more control messages to the reference WLAN device 104 and can receive corresponding one or more response control messages (e.g., acknowledgement (ACK) messages) from the reference WLAN device 104. The location calculation unit 110 can record the time instants at which the control messages were transmitted to and the corresponding response control messages were received from the reference WLAN device 104. At each position of the unknown WLAN device 102, the location calculation unit 110 can calculate the RTT between the unknown WLAN device 102 and the reference WLAN device 104 ("RTT associated with the reference WLAN device") as the elapsed time between transmitting the control messages and receiving the corresponding response control messages, as will further be described in blocks 508-512 of FIG. 5. Likewise, at each position of the unknown WLAN device 102, the location calculation unit 110 can also calculate the RTT associated with the reference WLAN devices 106, 108, and 112. It is noted that in other implementations, other suitable techniques can be employed to determine the RTT associated with the reference WLAN devices 104, 106, 108, and 112.

At stage C, the location calculation unit 110 calculates an initial location of the unknown WLAN device 102 based, at least in part, on the location of each of the reference WLAN devices 104, 106, 108, and 112. As one example, the location calculation unit 110 can calculate the initial location of the unknown WLAN device 102 as the average of the known locations of the reference WLAN devices 104, 106, 108, and 112, as will be described in FIGS. 2 and 3. At stage C, the location calculation unit 110 also determines an initial distance calibration constant associated with each of the reference WLAN devices 104, 106, 108, and 112. The initial distance calibration constant associated with each of the reference WLAN devices 104, 106, 108, and 112 can be zero, a random value, or another suitable predetermined value. As described below, the location calculation unit 110 can use the calculated initial location of the unknown WLAN device 102 and the initial distance calibration constant associated with each of the reference WLAN devices 104, 106, 108, and 112 as an input to a first positioning algorithm (e.g., a Taylor series-based TDOA positioning algorithm as described in FIG. 2, a Taylor-series based TOA1 positioning algorithm as described in FIG. 3, a Taylor-series based TOA2 positioning algorithm as described in FIG. 4, etc.) to determine an intermediate location of the unknown WLAN device 102 at each position of the unknown WLAN device 102.

At stage D, the location calculation unit 110 executes a first positioning algorithm to determine the intermediate location of the unknown WLAN device 102 (for each position of the unknown WLAN device 102) and to determine the distance calibration constant for each of the reference WLAN devices 104, 106, 108, and 112. The location calculation unit 110 can execute the first positioning algorithm (e.g., Taylor series-based TDOA positioning algorithm as described in FIG. 2, a Taylor-series based TOA1 positioning algorithm as described in FIG. 3, a Taylor-series based TOA2 positioning algorithm as described in FIG. 4, etc.) to determine the intermediate location of the unknown WLAN device 102 at each of the plurality of positions of the unknown WLAN device 102 based, at least in part, on the initial location of the unknown WLAN device 102, the RTT associated with each of the reference WLAN devices 104, 106, 108, and 112, the initial distance calibration constants associated with each of the reference WLAN devices 104, 106, 108, and 112, and the location of each of the reference WLAN devices 104, 106, 108, and 112. For example, the location calculation unit 110 can determine a first estimate of the intermediate location that corresponds to the first position of the unknown WLAN device 102 based on a first set of RTT measurements associated with the reference WLAN devices, initial locations of the reference WLAN devices, initial distance calibration constants of the reference WLAN devices, and a first initial location of the unknown WLAN device 102. The location calculation unit 110 can execute the above-described operations to determine the first estimate of the intermediate location that correspond to each of the other positions of the unknown WLAN device 102. The location calculation unit 110 can also calculate a first estimate of the distance calibration constant for each of the reference WLAN devices based, at least in part, on the first intermediate location (for all the positions) of the unknown WLAN device. The location calculation unit 110 can execute one or more iterations of the first positioning algorithm to improve the estimate of the intermediate location of the unknown WLAN device 102 (at each of the positions of the unknown WLAN device 102) using a last calculated estimate of the distance calibration constant for each of the reference WLAN devices. The location calculation unit 110 can execute one or more iterations of the first positioning algorithm to improve the estimate of the distance calibration constant for each of the reference WLAN devices using a last calculated estimate of the intermediate location that correspond to each of the other positions of the unknown WLAN device 102. Operations for determining the intermediate locations of the unknown WLAN device 102 and the distance calibration constant associated with each of the reference WLAN devices are further described in FIGS. 2 and 3.

At stage E, the location calculation unit 110 executes a second positioning algorithm to estimate one or more of the positions of the unknown WLAN device 102. As described above, the location calculation unit 110 can execute multiple iterations of the first positioning algorithm to determine the intermediate location (at each position) of the unknown WLAN device 102 and to determine the distance calibration constant associated with each of the reference WLAN devices. The results of the last iteration of the first positioning algorithm can be provided as an input to the second positioning algorithm. The location calculation unit 110 can identify at least a subset of the plurality of positions of the unknown WLAN device 102 that should be determined. In some implementations, the location calculation unit 110 may be configured in a "real-time operating mode." In this operating mode, the location calculation unit 110 may be configured to only estimate the current position of the unknown WLAN device 102. In other implementations, the location calculation unit 110 may be configured in a "tracking mode." In this operating mode, the location calculation unit 110 may be configured to estimate the current position and all the previous positions of the unknown WLAN device 102. In other implementations, the location calculation unit 110 may prompt the user of the unknown WLAN device 102 to select which of the positions of the unknown WLAN device 102 should be estimated. For example, if the unknown WLAN device 102 was moved 5 times (e.g., to corresponding 5 different positions) and if the unknown WLAN device 102 is currently at the fifth position, the user may indicate that the coordinates of the unknown WLAN device 102 at the third position should be estimated. For each position of the selected subset of the plurality of positions of the unknown WLAN device 102, the location calculation unit 110 can execute the second positioning algorithm to estimate the position of the unknown WLAN device 102 based, at least in part, on the corresponding intermediate location of the unknown WLAN device, the distance calibration constants associated with each of the reference WLAN devices, the RTT associated with each of the reference WLAN devices, and the locations of each of the reference WLAN devices.

Figure 2:
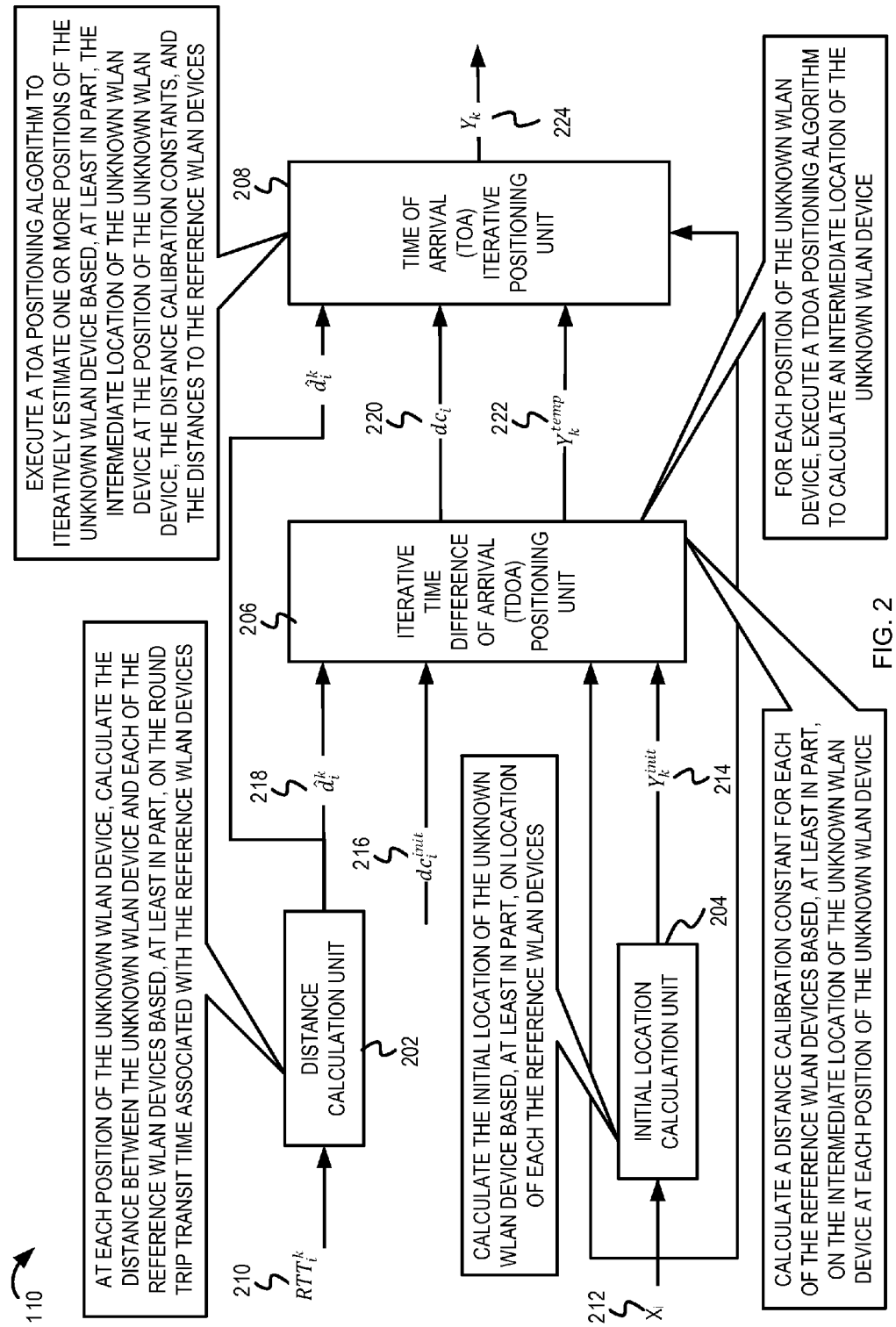
FIG. 2 is an example block diagram of one embodiment of the location calculation unit including a hybrid TDOA-TOA positioning mechanism.

FIG. 2 is an example block diagram of one embodiment of the location calculation unit 110 including a hybrid TDOA-TOA positioning mechanism. The location calculation unit 110 comprises a distance calculation unit 202, an initial location calculation unit 204, a TDOA positioning unit 206, and a TOA positioning unit 208. The distance calculation unit 202 and the initial location calculation unit 204 are coupled with the TDOA positioning unit 206. The distance calculation unit 202, the initial location calculation unit 204, and the TDOA positioning unit 206 are coupled with the TOA positioning unit 208.

The distance calculation unit 202 can calculate (at each position of the unknown WLAN device 102) the distance between the unknown WLAN device 102 and each of the reference WLAN devices 104, 106, 108, and 112 based, at least in part, on the corresponding RTT associated with each of the reference WLAN devices. As depicted in FIG. 2, the distance calculation unit 202 takes as an input parameter the measured RTT 210 between the unknown WLAN device 102 and each of the reference WLAN devices 104, 106, 108, and 112. If i represents a counter for the each of the reference WLAN devices, k represents a counter for a current position of the unknown WLAN device 102, and N represents the number of reference WLAN devices in the wireless communication network 100, then the input to the distance calculation unit 202 at the $k^{th}$ position of the unknown WLAN device 102 is $RTT_i^k$ (i.e., $RTT_1^k$, $RTT_2^k$, ... $RTT_N^k$) as depicted in FIG. 2. The output of the distance calculation unit 202 is the measured distance 218 ($\hat{d}_i^k$) between the unknown WLAN device 102 (at the $k^{th}$ position) and the $i^{th}$ reference WLAN device. Thus, if $RTT_i^k$ represents the RTT associated with the $i^{th}$ reference WLAN device when the unknown WLAN device 102 is at the $k^{th}$ position, and c represents the speed of light, the measured distance $\hat{d}_i^k$ 218 can be calculated in accordance with Eq. 1a.

$$\hat{d}_i^k = c \times \frac{RTT_i^k}{2} \qquad \text{Eq. 1a}$$

It is noted that the actual distance ($d_i^k$) between the unknown WLAN device 102 (at the $k^{th}$ position) and the $i^{th}$ reference WLAN device can be represented as the sum of a distance calibration constant ($dc_i$) associated with the $i^{th}$ reference WLAN device and the measured distance ($\hat{d}_i^k$) 218 between the unknown WLAN device 102 and the $i^{th}$ reference WLAN device, as depicted in Eq. 1b.

$$d_i^k = dc_i + \hat{d}_i^k \qquad \text{Eq. 1b}$$

The distance calibration constant ($dc_i$) associated with the $i^{th}$ reference WLAN device can represent the difference between the measured distance ($\hat{d}_i^k$) and the actual distance ($d_i^k$) and may be indicative of internal processing time (or turnaround time) associated with the $i^{th}$ reference WLAN device. For example, the distance calibration constant associated with the reference WLAN device 104 can account for the elapsed time between the reference WLAN device 104 detecting a control message from the unknown WLAN device 102 and the reference WLAN device 104 transmitting a response control message to the unknown WLAN device 102. The distance calibration constant ($dc_i$) may also depend on the type and configuration of the reference WLAN device 104. As described herein, each of the reference WLAN devices 104, 106, 108, and 112 may be associated with a different distance calibration constant.

The initial location calculation unit 204 can calculate the initial location of the unknown WLAN device 102 at the $k^{th}$ position based, at least in part, on the location 212 of each of the reference WLAN devices 104, 106, 108, and 112. As depicted in FIG. 2, the known locations 212 of the reference WLAN devices 104, 106, 108, and 112 are provided as input parameters to the initial location calculation unit 204. In FIG. 2, i represents a counter for the reference WLAN devices and $X_i$ represents the location 212 (e.g., also referred to as absolute location, actual location, or real location) of the $i^{th}$ reference WLAN device. In one implementation, the location 212 of the $i^{th}$ reference WLAN device can be represented in the form, $X_i = \{x_i^s, s=0, 1, \ldots, D-1\}$, where D represents the dimension of the coordinate system used to specify the location of the reference WLAN device (e.g., if the location of the reference WLAN devices is specified in terms of a X, Y, and Z coordinates, then D=3), s represents a counter for the dimension of the coordinate system (i.e., the dimension index), and 4 represents the value of the $s^{th}$ dimension of the location of the $i^{th}$ reference WLAN device. It is noted that the location of the reference WLAN devices can be expressed using another suitable coordinate system (e.g., Cartesian coordinates, spherical coordinates, geodesic coordinates, etc.). Furthermore, the location of the reference WLAN devices can be expressed in any suitable number of dimensions (e.g., 2-dimensional coordinates, 3-dimensional coordinates, etc.)

As depicted in FIG. 2, the output of the initial location calculation unit 204 is the initial location ($Y_k^{init}$) 214 of the unknown WLAN device 102, when the unknown WLAN device 102 is at the $k^{th}$ position. In one implementation, the initial location 214 of the unknown WLAN device 102 can be represented as $Y_k^{init} = \{y_k^{init,s}, s=0, 1, \ldots, D-1\}$, where D represents the dimension of the coordinate system and $y_k^{init,s}$ represents the value of the $s^{th}$ dimension of the initial location of the unknown WLAN device 102, when the unknown WLAN device 102 is at the $k^{th}$ position. In some implementations, the initial location 214 of the unknown WLAN device 102 can be expressed as a function $f(.)$ of the known locations 212 of the reference WLAN devices, as depicted in Eq. 2a. In some implementations, the initial location 214 of the unknown WLAN device 102 can be calculated as an average of the known locations 212 of the reference WLAN devices, as depicted in Eq. 2b. In another implementation, the initial location 214 of the unknown WLAN device 102 can be calculated by maximizing the determinant of a product of matrices generated during the execution of a Taylor series based TDOA positioning algorithm, as depicted in Eq. 2c. Maximizing the expression $\det(B_{TDoA,k}^T B_{TDoA,k})$ as depicted in Eq. 2c can ensure that the TDOA positioning algorithm (described below) converges to a good estimate of the intermediate location of the unknown WLAN device 102. In Eq. 2c, $B_{TDoA,k}^T$ represents the transpose of the $B_{TDoA,k}$ matrix and the $B_{TDoA,k}$ matrix will further be described below with reference to Exp. 10 of FIG. 2.

$$Y_k^{init} = f(X_0, X_1, \ldots X_{N-1})$$ Eq. 2a $$Y_k^{init} = f(X_0, X_1, \ldots X_{N-1}) = \frac{1}{N}\sum_{i=0}^{N-1} X_i$$ Eq. 2b $$Y_k^{init} = f(X_0, X_1, \ldots X_{N-1}) = \max_{Y_k^{init}}\{\det(B_{TDoA,k}^T B_{TDoA,k})\}$$ Eq. 2c It is noted that in other implementations, the initial location calculation unit 204 can employ other suitable techniques to calculate the initial location 214 of the unknown WLAN device 102. For example, the initial location 214 (at the $k^{th}$ position) of the unknown WLAN device 102 can be calculated as a weighted average of the known locations 212 of the reference WLAN devices where the weights are selected based on the confidence of the location of the reference WLAN devices and/or based the distance between the reference WLAN devices and the unknown WLAN device 102. As another example, the initial location 214 of the unknown WLAN device 102 can be calculated as a weighted (or non-weighted) combination of the known locations 212 of only a subset of the reference WLAN devices. It is noted that calculating the initial location 214 of the unknown WLAN device 102 (as opposed to randomly selecting or using a zero initial location) can help achieve convergence of the Taylor series based TDOA positioning algorithm. Furthermore, in some implementations, the initial location calculation unit 204 can calculate the initial location 214 of the unknown WLAN device 102 once, and can use this value to analyze all the positions to which the unknown WLAN device 102 is moved. In other implementations, the initial location calculation unit 204 can recalculate (e.g., possibly use different techniques) the initial location 214 of the unknown WLAN device 102 each time the unknown WLAN device 102 is moved to a different position.

The TDOA positioning unit 206 can iteratively execute a Taylor series based TDOA positioning algorithm to calculate the intermediate location 222 of the unknown WLAN device 102 (at each position of the unknown WLAN device 102) based, at least in part, on the initial location 214 of the unknown WLAN device 102, the distance 218 to each of the reference WLAN devices, an initial distance calibration constant associated with each of the reference WLAN devices, and the known locations 212 of the reference WLAN devices. For each position of the unknown WLAN device 102, the following inputs can be provided to the TDOA positioning unit 206—A) the measured distance 218 $\hat{d}_i^k$ (as depicted in Eq. 1a) between the unknown WLAN device 102 at the $k^{th}$ position and each reference WLAN device, B) the initial location 214 of the unknown WLAN device 102 ($Y_k^{init}$), C) the known locations 212 ($X_i$) of the reference WLAN devices, and D) the initial distance calibration constant 216 ($dc_i^{init}$) associated with each of the reference WLAN devices 104, 106, 108, and 112. The initial distance calibration constant 216 can be a randomly selected value, zero, or another suitable value. In some implementations, the initial distance calibration constant 216 may be preconfigured, while in other implementations the initial distance calibration constant 216 may be dynamically selected (e.g., a random value may be dynamically selected for the initial distance calibration constant 216).

The TDOA positioning unit 206 can then execute the TDOA positioning algorithm to solve the expression depicted by Eq. 3a and to determine the intermediate location ($Y_k^{temp}$) 222 of the unknown WLAN device 102, when the unknown WLAN device is at the $k^{th}$ position. In accordance with Eq. 3a, the TDOA positioning unit 206 can attempt to identify the value of $Y_k^{temp}$ that minimizes the sum of the estimation error between A) the measured distance difference determined based on the RTT associated with each pair of reference WLAN devices and B) the estimated distance difference based on the known locations of the pair of reference WLAN devices. In Eq. 3a, $\|X_i - Y_k^{temp}\|$ represents the estimated distance between the $i^{th}$ reference WLAN device and the unknown WLAN device 102 at the $k^{th}$ position, while $\|X_j - Y_k^{temp}\|$ represents the estimated distance between the $j^{th}$ reference WLAN device and the unknown WLAN device 102 at the $k^{th}$ position. The estimated distance between a reference WLAN device and the unknown WLAN device 102 can be determined based on the actual location of the reference WLAN device and the estimated intermediate location ($Y_k^{temp}$) of the unknown WLAN device at the $k^{th}$ position. The estimated distance between the $i^{th}$ reference WLAN device and the unknown WLAN device 102 at the $k^{th}$ position can be expressed in accordance with Eq. 3b.

$$Y_k^{temp} = \arg\min_{Y_k^{temp}}\left\{\sum_{i=0}^{N-1}\sum_{j=0}^{N-1}\left(\frac{\hat{d}_i^k - \hat{d}_j^k + dc_i^{init} - dc_j^{init} -}{\|X_i - Y_k^{temp}\| + \|X_j - Y_k^{temp}\|}\right)^2\right\}$$ Eq. 3a $$\|X_i - Y_k^{temp}\| = \left[\sum_{s=0}^{D-1}(x_i^s - y_k^{temp,s})^2\right]^{\frac{1}{2}}$$ Eq. 3b In some implementations, by assuming that there is no estimation error (i.e., by assuming that $(\hat{d}_i^k - \hat{d}_j^k + dc_i^{init} - dc_j^{init} - \|X_i - Y_k^{temp}\| + \|X_j - Y_k^{temp}\|) = 0$, the TDOA positioning unit 206 can simplify Eq. 3a and can instead solve Eq. 4 for all values of i and j to determine the intermediate location 222 of the unknown WLAN device 102 at the $k^{th}$ position.

$$\hat{d}_i^k - \hat{d}_j^k + dc_i^{init} - dc_j^{init} = \|X_i - Y_k^{temp}\| + \|X_j - Y_k^{temp}\|$$ Eq. 4

The intermediate location ($Y_k^{temp}$) 222 of the unknown WLAN device 102 can be expressed as the sum of the initial location ($Y_k^{init}$) 214 of the unknown WLAN device 102 and a location error ($\Delta Y_{TDOA,k}$), as depicted in Eq. 5. In other words, the location error can represent the difference between the estimated intermediate location 222 of the unknown WLAN device 102 (at the $k^{th}$ position) and the initial location 214 of the unknown WLAN device 102 (at the $k^{th}$ position). In some implementations, the location error $\Delta Y_{TDOA,k}$ can be represented as $\Delta Y_{TDOA,k} = \{\Delta y_{TDOA,k}, s=0, 1, \ldots D-1\}$, where D represents the dimension of the coordinate system and $\Delta y_{TDOA,k}^s$ represents the value of the $s^{th}$ dimension of the location error associated with the unknown WLAN device 102. The TDOA positioning unit 206 can substitute Eq. 5 into Eq. 4 to yield Eq. 6.

$$Y_k^{temp} = Y_k^{init} + \Delta Y_{TDOA,k}$$ Eq. 5

$$\hat{d}_i^k - \hat{d}_j^k + dc_i^{init} - dc_j^{init} = \|X_i - Y_k^{init} - \Delta Y_{TDOA,k}\| - \|X_j - Y_k^{init} - \Delta Y_{TDOA,k}\|$$ Eq. 6

The TDOA positioning unit 206 can then use Taylor series expansion and neglect the second and higher order terms (e.g., because the higher order terms have a zero or negligible value), to yield Eq. 7.

$$\hat{d}_i^k - \hat{d}_j^k + dc_i^{init} - dc_j^{init} = \|X_i - Y_k^{init}\| - \|X_j - Y_k^{init}\| + \sum_{s=0}^{D-1}\left(\frac{x_j^s - y_k^{init,s}}{\|X_j - Y_k^{init}\|} - \frac{x_i^s - y_k^{init,s}}{\|X_i - Y_k^{init}\|}\right)\Delta y_{TDOA,k}^s$$ Eq. 7

The TDOA positioning unit 206 can then extend Eq. 7 for each distinct pair of reference WLAN devices (e.g., all combinations of i and j, where i≠j), and can organize the plurality of equations in matrix form to yield Eq. 8.

$$A_{TDOA,k} = B_{TDOA,k} \Delta Y_{TDOA,k}^T \quad \text{Eq. 8}$$

In one implementation, $\Delta Y_{TDOA,k}^T$ is a D×1 column matrix that represents the transpose of the TDOA location error matrix associated with the unknown WLAN device 102 at the $k^{th}$ position. In other words, the TDOA location error matrix ($\Delta Y_{TDOA,k}$) represents the difference between the estimated intermediate location 222 of the unknown WLAN device 102 (at the $k^{th}$ position) and the initial location 214 of the unknown WLAN device 102 (at the $k^{th}$ position). The TDOA location error matrix can be represented in accordance with Exp. 9a. The TDOA distance error matrix ($A_{TDOA,k}$) can be an {N(N−1)/2}×1 column matrix, where each row of the TDOA distance error matrix can be represented in accordance with Exp. 9b. Each element of the TDOA distance error matrix can correspond to a unique combination of two of the reference WLAN devices. Each element of the TDOA distance error matrix can represent the difference (or the distance error) between A) the measured difference between the unknown WLAN device at the $k^{th}$ position and a pair of reference WLAN devices and B) the estimated distance difference between the unknown WLAN device at the $k^{th}$ position and the pair of reference WLAN devices based on the known locations of the pair of reference WLAN devices and the initial location of the unknown WLAN device 102.

$$\Delta Y_{TDOA,k} = [\Delta y_{TDOA,k}^0 \; \Delta y_{TDOA,k}^1 \; \ldots \; \Delta y_{TDOA,k}^{D-1}] \quad \text{Exp. 9a}$$

$(i+j)^{th}$ element of $A_{TDOA,k}$: $\hat{d}_i^k - \hat{d}_j^k + dc_i^{init} - dc_j^{init} - \|X_i - Y_k^{init}\| + \|X_j - Y_k^{init}\|$ \quad Exp. 9b The TDOA coefficient matrix ($B_{TDOA,k}$) can be an {N(N−1)/2}×D matrix, where N represents the number of reference WLAN devices and D represents the dimension of the coordinate system. Each element of the TDOA coefficient matrix can be represented by Exp. 10. The TDOA coefficient matrix can comprise the coefficients of the $\Delta Y_{TDOA,k}^T$ matrix and can represent the relationship between the transpose of the TDOA location error matrix ($\Delta Y_{TDOA,k}^T$) and the TDOA distance error matrix ($A_{TDOA,k}$).

$(i+j,s)^{th}$ element of $B_{TDoA,k}$: $\dfrac{x_j^s - y_k^{init,s}}{\|X_j - Y_k^{init}\|} - \dfrac{x_i^s - y_k^{init,s}}{\|X_i - Y_k^{init}\|}$ \quad Exp. 10

In one implementation, the dimension (e.g., the value of s) can vary from column to column, while the pair of reference devices under consideration (e.g., the values of i and j, where j>i) can vary from row to row. The dimension (the s value) can remain constant throughout a particular column, while the pair of the reference WLAN devices under consideration can remain constant throughout a particular row. The TDOA positioning unit 206 can then calculate the TDOA location error matrix ($\Delta Y_{TDOA,k}$) in accordance with Eq. 11. It is noted that in some implementations, prior to evaluating Eq. 11, the TDOA positioning unit 206 may first determine whether the condition $\det(B_{TDOA,k}^T B_{TDOA,k}) \neq 0$ is satisfied to ensure convergence of the Taylor series based TDOA positioning algorithm.

$$\Delta Y_{TDOA,k}^T = (B_{TDOA,k}^T B_{TDOA,k})^{-1} B_{TDOA,k}^T A_{TDOA,k} \quad \text{Eq. 11}$$

After the TDOA positioning unit 206 calculates the location error in accordance with Eq. 11, the TDOA positioning unit 206 can use Eq. 5 to determine a first estimate of the intermediate location (at the $k^{th}$ position) of the unknown WLAN device ($Y_k^{temp}$) by summing the location error ($\Delta Y_{TDOA,k}$) with the initial location 214 of the unknown WLAN device 102 ($Y_k^{init}$). In one implementation, the intermediate location 222 of the unknown WLAN device 102 at the $k^{th}$ position can be represented as $Y_k^{temp} = \{y_k^{temp,s}, s=0, 1, \ldots, D-1\}$, where $y_k^{temp,s}$ represents the value of the $s^{th}$ dimension of the location of the unknown WLAN device 102 at the $k^{th}$ position.

For each of the reference WLAN devices and at each position of the unknown WLAN device, the TDOA positioning unit 206 can estimate the distance calibration constant ($dc_k^i$) based on the distance to the reference WLAN device ($\hat{d}_i^k$) and the first estimate of the intermediate location of the unknown WLAN device (at the $k^{th}$ position), in accordance with Eq. 12.

$$dc_k^i = \|X_i - Y_k^{temp}\| - \hat{d}_i^k \quad \text{Eq. 12}$$

If the unknown WLAN device 102 was moved to M different positions, the TDOA positioning unit 206 can determine the distance calibration constant for each of the reference WLAN devices 104, 106, 108, 112 when unknown WLAN device 102 is at each of the M positions, in accordance with Eq. 12. The first estimate of the distance calibration constant 220 ($dc_i$) for the $i^{th}$ reference WLAN device can be updated in accordance with Eq. 13.

$$dc_i = \frac{1}{M} \sum_{k=0}^{M-1} dc_k^i \quad \text{Eq. 13}$$

The TDOA positioning unit 206 can substitute the first estimate of the intermediate location of the unknown WLAN device (at the $k^{th}$ position) and the first estimate of the distance calibration constant determined using Eq. 13 into Eq. 11 to calculate a second estimate of the location error. The TDOA positioning unit 206 can substitute the second estimate of the location error into Eq. 5 to determine a second estimate of the intermediate location at each of the positions of the unknown WLAN device 102. The TDOA positioning unit 206 can re-calculate the distance calibration constant for each of the reference WLAN devices and at each of the M positions of the unknown WLAN device 102 as described above with reference to Eq. 12. The TDOA positioning unit 206 can calculate the second estimate of the distance calibration constant 220 for each of the reference WLAN devices as described above in Eq. 13. In some implementations, the operations described herein for iteratively determining estimates of the intermediate location 222 (at each of the M positions) of the unknown WLAN device and for determining estimates of the distance calibration constant 220 for each of the reference WLAN devices can be executed until the estimates of the intermediate location and the estimates of the distance calibration constant are sufficiently stable. In other words, the TDOA positioning operations can be executed until the error between successive estimates of the intermediate location is less than a predetermined location error threshold. Likewise, the TDOA positioning operations can be executed until the error between successive estimates of the distance calibration constant is less than a predetermined distance calibration error threshold. For example, the TDOA positioning unit 206 may stop the iterative process of determining the distance calibration constant when the difference between a current estimate of the distance calibration constant and a preceding estimate of the distance calibration constant is less than the predetermined distance calibration error threshold. In other implementations, the TDOA positioning unit 206 may stop the iterative process of determining the distance calibration constant and the intermediate location of the unknown WLAN device (at each of the M positions) after a predetermined number of iterations have been executed.

After the TDOA positioning unit 206 completes the above-described iterative process, the latest estimate of the distance calibration constant ("target distance calibration constant") 220 associated with each of the reference WLAN devices can be provided to the TOA positioning unit 208. Likewise, for each of the M positions of the unknown WLAN device 102, the latest estimate of the intermediate location 222 of the unknown WLAN device can be provided to the TOA positioning unit 208. It is noted that the intermediate location 222 of the unknown WLAN device at the $k^{th}$ position is a rough estimate of the $k^{th}$ position of the unknown WLAN device 102. The TOA positioning unit 208 can use the intermediate location 222 of the unknown WLAN device at the $k^{th}$ position as an initial location to determine a more accurate estimate of the $k^{th}$ position of the unknown WLAN device 102.

As depicted in FIG. 2, the TOA positioning unit 208 receives the following inputs—A) the intermediate location 222 of the unknown WLAN device (at the $k^{th}$ position), B) the target distance calibration constant 220 associated with each of the reference WLAN devices, C) the distance 218 to each of the reference WLAN devices, when the unknown WLAN device is at the $k^{th}$ position, and D) the known locations 212 of the reference WLAN devices. Accordingly, the TOA positioning unit 208 can calculate an estimate of the $k^{th}$ position of the unknown WLAN device 102. The TOA positioning unit 208 can represent the measured distance ($\hat{d}_i^k$) between the unknown WLAN device 102 (at the $k^{th}$ position) and the $i^{th}$ reference WLAN device as the difference between the calculated distance $\mu X_i - Y_k^{temp}\|$ (using the intermediate location 222 of the unknown WLAN device at the $k^{th}$ position) and the target distance calibration constant 222 associated with the $i^{th}$ reference WLAN device, as depicted in Eq. 14.

$$\hat{d}_i^k = \|X_i - Y_k^{temp}\| - dc_i \qquad \text{Eq. 14}$$

The TOA positioning unit 208 can execute a Taylor-series based TOA2 positioning algorithm and can iteratively execute the expression depicted by Eq. 15 to gradually approach the real $k^{th}$ position ($Y_k$) 224 of the unknown WLAN device 102 after several iterations. In accordance with Eq. 15, the TOA positioning unit 208 can attempt to identify the value of $Y_k$ that minimizes the sum of the estimation error between A) the measured distance to the $i^{th}$ reference WLAN device determined in Eq. 1a based on the RTT associated with the $i^{th}$ reference WLAN device and B) the estimated distance to the $i^{th}$ reference WLAN device based on the known location of the $i^{th}$ reference WLAN device. In Eq. 15, $\|X_i - Y_k\|$ represents the estimated distance between the location $X_i$ of the $i^{th}$ reference WLAN device and the $k^{th}$ position (to be determined) of the unknown WLAN device. The estimated distance between the $i^{th}$ reference WLAN device and the $k^{th}$ position of the unknown WLAN device can be expressed in accordance with Eq. 3b.

$$Y_k = \underset{Y_k}{\operatorname{argmin}} \left\{ \sum_{i=0}^{N-1} \left( \hat{d}_i^k + dc_i - \|X_i - Y_k\| \right)^2 \right\} \qquad \text{Eq. 15}$$

In some implementations, by assuming that there is no estimation error {e.g., by assuming that ($\hat{d}_i^k + dc_i - \|X_i - Y_k\|$)=0}, the TOA positioning unit 208 can simplify Eq. 15 and can instead solve Eq. 16 for all values of i to determine the $k^{th}$ position 224 of the unknown WLAN device 102.

$$\hat{d}_i^k + dc_i = \|X_i - Y_k\| \qquad \text{Eq. 16}$$

The $k^{th}$ position 224 of the unknown WLAN device 102 ($Y_k$) can be expressed as the sum of the intermediate location 222 of the unknown WLAN device at the $k^{th}$ position and a TOA location error ($\Delta Y_{TOA,k}$), as depicted in Eq. 17. It is noted that in some implementations, the TOA location error can be represented as $\Delta Y_{TOA,k} = \{\Delta y_{TOA,k}^s, s=0, 1, \ldots, D-1\}$, where $\Delta y_{TOA,k}^s$ represents the value of the $s^{th}$ dimension of the TOA location error at the $k^{th}$ position of the unknown WLAN device. The TOA positioning unit 208 can substitute Eq. 17 into Eq. 16 to yield Eq. 18.

$$Y_k = Y_k^{temp} + \Delta Y_{TOA,k} \qquad \text{Eq. 17}$$

$$\hat{d}_i^k + dc_i = \|X_i - Y_k^{temp} - \Delta Y_{TOA,k}\|, \qquad \text{Eq. 18}$$

The TOA positioning unit 208 can then use Taylor series expansion and neglect the second and higher order terms (e.g., because the higher order terms have a zero or negligible value), to yield Eq. 19. For the $k^{th}$ position of the unknown WLAN device, the TOA positioning unit 208 can generate an equation in accordance with Eq. 19 for each of the reference WLAN devices 104, 106, 108, and 112 and can organize the plurality of generated equations in matrix form to yield Eq. 20.

$$\hat{d}_i^k + dc_i = \|X_i - Y_k^{temp}\| + \sum_{s=0}^{D-1} \left( -\frac{x_i^s - y_k^{temp,s}}{\|X_i - Y_k^{temp}\|} \right) \Delta y_{TOA,k}^s \qquad \text{Eq. 19}$$

$$A_{ToA,k} = B_{ToA,k} \Delta Y_{TOA,k}^T \qquad \text{Eq. 20}$$

In one implementation, $\Delta Y_{TOA,k}^T$ is a D×1 column matrix that represents the transpose of the TOA location error matrix associated with the unknown WLAN device 102 at the $k^{th}$ position. In other words, the TOA location error matrix ($\Delta Y_{TOA,k}$) can represent the difference between the estimated $k^{th}$ position of the unknown WLAN device 102 and the intermediate location 222 of the unknown WLAN device 102 (at the $k^{th}$ position). The TOA distance error matrix ($A_{ToA,k}$) can be an N×1 column matrix, where each element (i.e., each row) of the $A_{ToA,k}$ matrix is represented by Exp. 21 and each row is associated with one of the reference WLAN devices. Each element of the $A_{ToA,k}$ matrix represents a combination of A) the measured distance 218 between the unknown WLAN device (at the $k^{th}$ position) and a reference WLAN device (e.g., based on RTT associated with the reference WLAN device as depicted in Eq. 1a), B) the distance calibration constant 220 associated with the reference WLAN device and C) the estimated distance between the unknown WLAN device and the reference WLAN device based on the known location of the reference WLAN device and the intermediate location of the unknown WLAN device 102 (at the $k^{th}$ position). The TOA coefficient matrix ($B_{ToA,k}$) can be an N×D matrix, where N represents the number of reference WLAN devices and D represents the dimensions of the coordinate system that is used to specify the location of the reference WLAN devices. Each element of the N×D $B_{ToA,k}$ matrix can be represented by Exp. 22.

$$i^{th} \text{ element of } A_{TOA,k}: \hat{d}_i^k + dc_i - \|X_i - Y_k^{temp}\| \qquad \text{Exp. 21}$$

$$(i, s)^{th} \text{ element of } B_{TOA,k}: -\frac{x_i^s - y_k^{temp,s}}{\|X_i - Y_k^{temp}\|} \qquad \text{Exp. 22}$$

As described above with reference to FIG. 2, in one implementation, the dimension (e.g., the value of s) can vary from column to column and can remain constant throughout a particular column. The reference device under consideration (e.g., the value of i) can vary from row to row and can remain constant throughout a particular row. The TOA positioning unit 208 can then calculate the TOA location error $\Delta Y_{TOA,k}$ in accordance with Eq. 23.

$$\Delta Y_{TOA,k}^T = (B_{ToA,k}^T B_{ToA,k})^{-1} B_{ToA,k}^T A_{ToA,k} \quad \text{Eq. 23}$$

Next, the TOA positioning unit 208 can use Eq. 17 to iteratively calculate the $k^{th}$ position 224 of the unknown WLAN device ($Y_k$) by summing the TOA location error ($\Delta Y_{TOA,k}$) with the intermediate location 222 of the unknown WLAN device 102 ($Y_k^{temp}$) at the $k^{th}$ position. In one implementation, the $k^{th}$ position 224 of the unknown WLAN device 102 can be represented as $Y_k = \{y_k^s, s=0, 1, \ldots, D-1\}$, where $y_k^s$ represents the value of the $s^{th}$ dimension of the $k^{th}$ position of the unknown WLAN device 102.

In the next iteration, the TOA positioning unit 208 can use the output of the TOA positioning unit 208 calculated at the previous iteration as an input to the TOA positioning unit {i.e., $Y_k^{temp}$ (at next iteration)=$Y_k$ (at previous iteration)} and use Eq. 17 and Eq. 23 to determine the TOA location error ($\Delta Y_{TOA,k}^T$) at the next iteration and the $k^{th}$ position of the unknown WLAN device 102 ($Y_k$) until the TOA location error is below a threshold error value or until a threshold number of iterations have been executed.

In some implementations, as described above, the TOA positioning unit 208 may be configured in a "tracking mode." In this operating mode, if the unknown WLAN device 102 was moved to M different positions (e.g., to determine the distance calibration constants associated with each of the reference WLAN devices and to determine the position of the unknown WLAN device as described above), the TOA positioning unit 208 may determine all of the M positions of the unknown WLAN device 102. In another implementation, the TOA positioning unit 208 may be configured in a "real-time operating mode." In this operating mode, the TOA positioning unit 208 may only determine the last/current position of the unknown WLAN device 102. In other implementations, the TOA positioning unit 208 may prompt the user to select which of the M positions should be determined.

Figure 3:
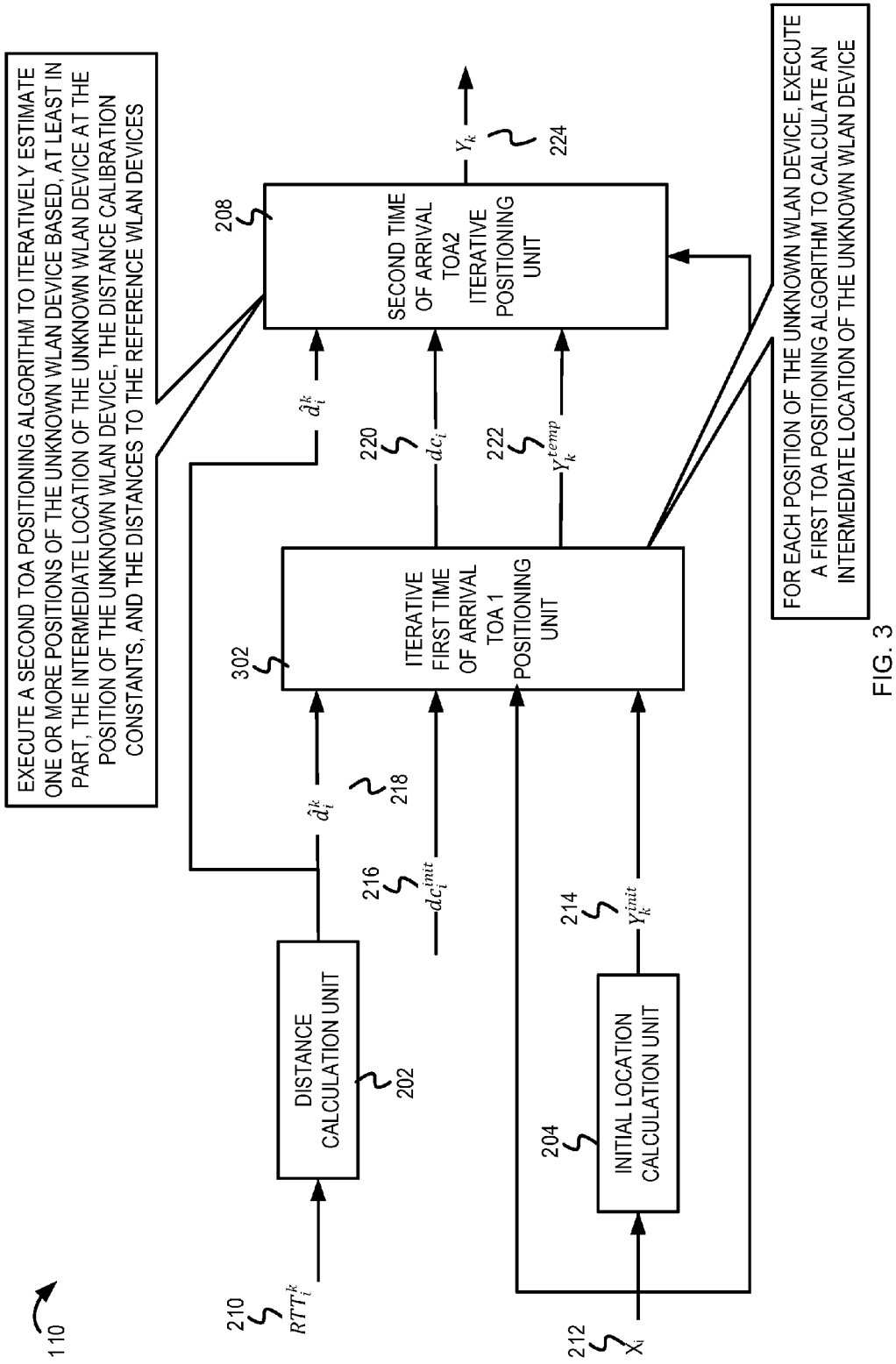
FIG. 3 is an example block diagram of another embodiment of the location calculation unit including a hybrid TOA1-TOA2 positioning mechanism.

FIG. 3 is an example block diagram of another embodiment of the location calculation unit including a hybrid TOA1-TOA2 positioning mechanism. In the example of FIG. 3, the location calculation unit 110 comprises the distance calculation unit 202, the initial location calculation unit 204, and the TOA2 positioning unit 208 of FIG. 2. The location calculation unit 110 also comprises a TOA1 positioning unit 302. In FIG. 3, the distance calculation unit 202 and the initial location calculation unit 204 are coupled with the TOA1 positioning unit 302. The TOA1 positioning unit 302, the distance calculation unit 202, and the initial location calculation unit 204 are coupled with the TOA2 positioning unit 208. As described above, the first TOA positioning algorithm (i.e., the TOA1 positioning algorithm) may not be sensitive to the accuracy of the distance calibration constant associated with each of the reference WLAN devices and can therefore (as described below) be employed to determine the distance calibration constant associated with each of the reference WLAN devices. The second TOA positioning algorithm (i.e., the TOA2 positioning algorithm) is typically sensitive to the accuracy of the distance calibration constants associated with each of the reference WLAN devices and can (as described below) be employed to determine the position of the unknown WLAN device (based on previously calculated distance calibration constants associated with each of the reference WLAN devices).

The distance calculation unit 202 can calculate the distance ($\hat{d}_i^k$) 218 between the unknown WLAN device 102 (at the $k^{th}$ position) and each of the reference WLAN devices 104, 106, 108, and 112 based, at least in part, on the corresponding RTT 210 associated with the reference WLAN devices, as described above in accordance with Eq. 1a of FIG. 2. The actual distance ($d_i^k$) between the unknown WLAN device 102 (at the $k^{th}$ position) and the $i^{th}$ reference WLAN device can be represented as the sum of a distance calibration constant ($dc_i$) associated with the $i^{th}$ reference WLAN device and the measured distance ($\hat{d}_i^k$) between the unknown WLAN device 102 and the $i^{th}$ reference WLAN device, as depicted in Eq. 1b. The initial location calculation unit 204 can calculate the initial location 214 of the unknown WLAN device 102 at the $k^{th}$ position based, at least in part, on the location 212 of each of the reference WLAN devices 104, 106, 108, and 112, as described above in accordance with Eq. 2a or Eq. 2b of FIG. 2. Additionally, in some implementations, the initial location 214 of the unknown WLAN device 102 can be calculated by maximizing the determinant of a product of matrices generated during the execution of a Taylor series based TOA1 positioning algorithm, as depicted in Eq. 24. Maximizing the expression $\det(B_{ToA1,k}^T B_{ToA1,k})$ as depicted in Eq. 24 can ensure that the TOA1 positioning algorithm (described below) converges to a good estimate of the intermediate location of the unknown WLAN device 102. In Eq. 24, $B_{ToA1,k}^T$ represents the transpose of the $B_{ToA1,k}$ matrix and the $B_{ToA1,k}$ matrix will further be described below with reference to Exp. 31c of FIG. 3.

$$Y_k^{init} = f(X_0, X_1, \ldots X_{N-1}) = \max_{Y_k^{init}} \{\det(B_{ToA1,k}^T B_{ToA1,k})\} \quad \text{Eq. 24}$$

The TOA1 positioning unit 302 can execute one or more iterations of a Taylor series based TOA1 positioning algorithm to calculate the intermediate location 222 of the unknown WLAN device 102 (at the $k^{th}$ position) and to estimate a distance calibration constant 220 associated with each of the reference WLAN devices. For each position of the unknown WLAN device 102, the following inputs can be provided to the TOA1 positioning unit 302—A) the measured distance 218 ($\hat{d}_i^k$) between the unknown WLAN device 102 at the $k^{th}$ position and each reference WLAN device, B) the initial location 214 ($Y_k^{init}$) of the unknown WLAN device 102, C) the known locations 212 ($X_i$) of the reference WLAN devices, and D) the initial distance calibration constant 216 ($dc_i^{init}$) associated with each of the reference WLAN devices.

The TOA1 positioning unit 302 can execute the TOA1 positioning algorithm to solve the expression depicted by Eq. 25 and to determine the intermediate location ($Y_k^{temp}$) 222 of the unknown WLAN device 102, when the unknown WLAN device is at the $k^{th}$ position. In accordance with Eq. 25, the TOA1 positioning unit 302 can attempt to identify the value of $Y_k^{temp}$ that minimizes the sum (across all the reference WLAN devices) of the estimation error between A) the measured distance to the $i^{th}$ reference WLAN device determined based on the RTT associated with the $i^{th}$ reference WLAN device and B) the estimated distance to the $i^{th}$ reference WLAN device based on the known location of the $i^{th}$ reference WLAN device. The estimated distance between a reference WLAN device and the unknown WLAN device can be determined based on the actual location of the reference WLAN device and the estimated location ($Y_k^{temp}$) of the unknown WLAN device at the $k^{th}$ position.

$$Y_k^{temp} = \arg\min_{Y_k^{temp}} \left\{ \sum_{i=0}^{N-1} \left( \hat{d}_i^k + dc_i - \|X_i - Y_k^{temp}\| \right)^2 \right\} \quad \text{Eq. 25}$$

In some implementations, by assuming that there is no estimation error {e.g., by assuming that ($\hat{d}_i^k + dc_i - \|X_i - Y_k^{temp}\|$)=0}, the TOA1 positioning unit 302 can simplify Eq. 25 and can instead solve Eq. 26 for all values of i to estimate the intermediate location 222 of the unknown WLAN device 102 at the $k^{th}$ position.

$$\hat{d}_i^k = \|X_i - Y_k^{temp}\| - dc_i \quad \text{Eq. 26}$$

The distance calibration constant ($dc_i$) 220 associated with the $i^{th}$ reference WLAN device can be expressed as the sum of the initial distance calibration constant ($dc_i^{init}$) 216 and a distance calibration error ($\Delta dc_i$), as depicted in Eq. 27a. Likewise, intermediate location ($Y_k^{temp}$) 222 of the unknown WLAN device 102 (at the $k^{th}$ position) can be expressed as the sum of the initial location ($Y_k^{init}$) 214 of the unknown WLAN device 102 (at the $k^{th}$ position) and a location error ($\Delta Y_{TOA1,k}$), as depicted in Eq. 27b. The TOA1 positioning unit 302 can substitute Eq. 27a and Eq. 27b into Eq. 26 to yield Eq. 28.

$$dc_i = dc_i^{init} + \Delta dc_i \quad \text{Eq. 27a}$$

$$Y_k^{temp} = Y_k^{init} + \Delta Y_{TOA1,k} \quad \text{Eq. 27b}$$

$$\hat{d}_i^k = \|X_i - Y_k^{init} - \Delta Y_{TOA1,k}\| - dc_i^{init} - \Delta dc_i \quad \text{Eq. 28}$$

The TOA1 positioning unit 302 can then use Taylor series expansion and neglect the second and higher order terms to yield Eq. 29. The TOA1 positioning unit 302 can generate an equation in accordance with Eq. 29 for each of the reference WLAN devices 104, 106, 108, and 112 (when the unknown WLAN device is at the $k^{th}$ position) and can organize the plurality of generated equations in matrix form to yield Eq. 30.

$$\hat{d}_i^k = \|X_i - Y_k^{init}\| - dc_i^{init} + \sum_{s=0}^{D-1} \left( -\frac{x_i^s - y_k^{init,s}}{\|X_i - Y_k^{init}\|} \right) \Delta y_{TOA1,k}^s - \Delta dc_i \quad \text{Eq. 29}$$

$$A_{ToA1,k} = B_{ToA1,k} [\Delta Y_{TOA1,k} \ \Delta dc_i]^T \quad \text{Eq. 30}$$

In some implementations, the TOA1 location error matrix ($\Delta Y_{TOA1,k}$) may be a 1×D row matrix that can represent the difference between the estimated intermediate location 222 of the unknown WLAN device 102 (at the $k^{th}$ position) and the initial location 214 of the unknown WLAN device 102 (at the $k^{th}$ position) as depicted in Exp 31a. The TOA1 distance error matrix ($A_{TOA1,k}$) can be an N×1 column matrix, where each element (i.e., each row) of the $A_{TOA1,k}$ matrix is represented by Exp. 31b and each row is associated with one of the reference WLAN devices. As depicted by Exp. 31b, each element of the TOA1 distance error matrix represents a combination of A) the estimated distance between the unknown WLAN device at the $k^{th}$ position and a reference WLAN device, B) the initial distance calibration constant 216 associated with the reference WLAN device, and C) the estimated distance between the unknown WLAN device at the $k^{th}$ position and the reference WLAN device based on the known location of the reference WLAN device and the initial location 214 of the unknown WLAN device 102. The TOA coefficient matrix ($B_{ToA1,k}$) can be an N×(D+1) matrix, where N represents the number of reference WLAN devices and D represents the dimensions of the coordinate system that is used to specify the location of the reference WLAN devices. Each element of the TOA1 coefficient matrix can be represented in accordance with Exp. 31c. The TOA1 coefficient matrix ($B_{TOA1,k}$) can comprise the coefficients of the TOA1 location error matrix ($\Delta Y_{ToA1,k}$) and can represent the relationship between the TOA1 location error matrix ($\Delta Y_{TOA1,k}$) and the TOA1 distance error matrix ($A_{ToA1,k}$).

$$\Delta Y_{TOA1,k} = [Y_{TOA1,k}^0 \ Y_{TOA1,k}^1 \ \ldots \ Y_{TOA1,k}^{D-2} \ Y_{TOA1,k}^{D-1}] \quad \text{Exp. 31a}$$

$i^{th}$ element of $A_{ToA1,k}$: $\hat{d}_i^k + dc_i^{init} - \|X_i - Y_k^{init}\|$  Exp. 31b $(i,s)^{th}$ element of $B_{ToA1,k}$: $-\dfrac{x_i^s - y_k^{init,s}}{\|X_i - Y_k^{init}\|}$,  Exp. 31c $s = 0, 1, \ldots, D-1$ $(i,D)^{th}$ element of $B_{ToA1,k}$: $-1$ In one implementation, the dimension (e.g., the value of s) can vary from column to column while the reference device under consideration (e.g., the value of i) can vary from row to row. The dimension can remain constant throughout a particular column while the reference device under consideration can remain constant throughout a particular row. The TOA1 positioning unit 302 can then calculate the TOA1 location error $\Delta Y_{TOA1,k}$ for the $k^{th}$ position of the unknown WLAN device 102. The TOA1 positioning unit 302 can also calculate the distance calibration error $\Delta dc_i$ in accordance with Eq. 32. It is noted that in some implementations, prior to evaluating Eq. 32, the TOA1 positioning unit 302 may first determine whether the condition $\det(B_{TOA1,k}^T B_{TOA1,k}) \neq 0$ is satisfied to ensure convergence of the Taylor series based TOA1 positioning algorithm.

$$[\Delta Y_{TOA1,k} \Delta dc_i]^T = (B_{ToA1,k}^T B_{ToA1,k})^{-1} B_{ToA1,k}^T A_{ToA1,k} \quad \text{Eq. 32}$$

After the TOA1 positioning unit 302 calculates the value of TOA1 location error (in accordance with Eq. 32), the TOA1 positioning unit 302 can use Eq. 27b to determine a first estimate of the intermediate location (at the $k^{th}$ position) of the unknown WLAN device ($Y_k^{temp}$) by summing the location error ($\Delta Y_{TOA1,k}$) with the initial location 214 of the unknown WLAN device 102) ($Y_k^{init}$). As described above in accordance with Eq. 12, the TOA1 positioning unit 302 can, for each of the reference WLAN devices and at each position of the unknown WLAN device, estimate the distance calibration constant ($dc_k^i$) based on the distance to the reference WLAN device ($\hat{d}_i^k$) and the first estimate of the intermediate location 222 of the unknown WLAN device (at the $k^{th}$ position). As described above in accordance with Eq. 13, the TOA1 positioning unit 302 can determine a first estimate of the initial distance calibration constant ($dc_i^{init}$) for the $i^{th}$ reference WLAN device. As described above, with reference to FIG. 2, the TOA1 positioning unit 302 can iteratively execute the TOA1 positioning operations described above for determining estimates of the intermediate location (at each of the M positions) of the unknown WLAN device 102 and for determining estimates of the distance calibration constant for each of the reference WLAN devices. The TOA1 positioning operations can be executed until A) the error between successive estimates of the intermediate location at each of the M positions of the unknown WLAN device 102 is less than a predetermined location error threshold, B) the error between successive estimates of the distance calibration constant associated with each of the reference WLAN devices is less than a distance calibration error threshold, and/or C) a predetermined number of iterations have been executed.

After the TOA1 positioning unit 302 completes the above-described iterative process, the last estimate of the distance calibration constant ("target distance calibration constant") 220 associated with each of the reference WLAN devices can be provided to the TOA2 positioning unit 208. Likewise, for each of the M positions of the unknown WLAN device 102, the last estimate of the intermediate location 222 of the unknown WLAN device 102 can be provided to the TOA2 positioning unit 208. The TOA2 positioning unit 208 can then execute operations described above with reference to FIG. 2 and Equations 14-23 to determine one or more of the M positions of the unknown WLAN device 102.

Figure 4:
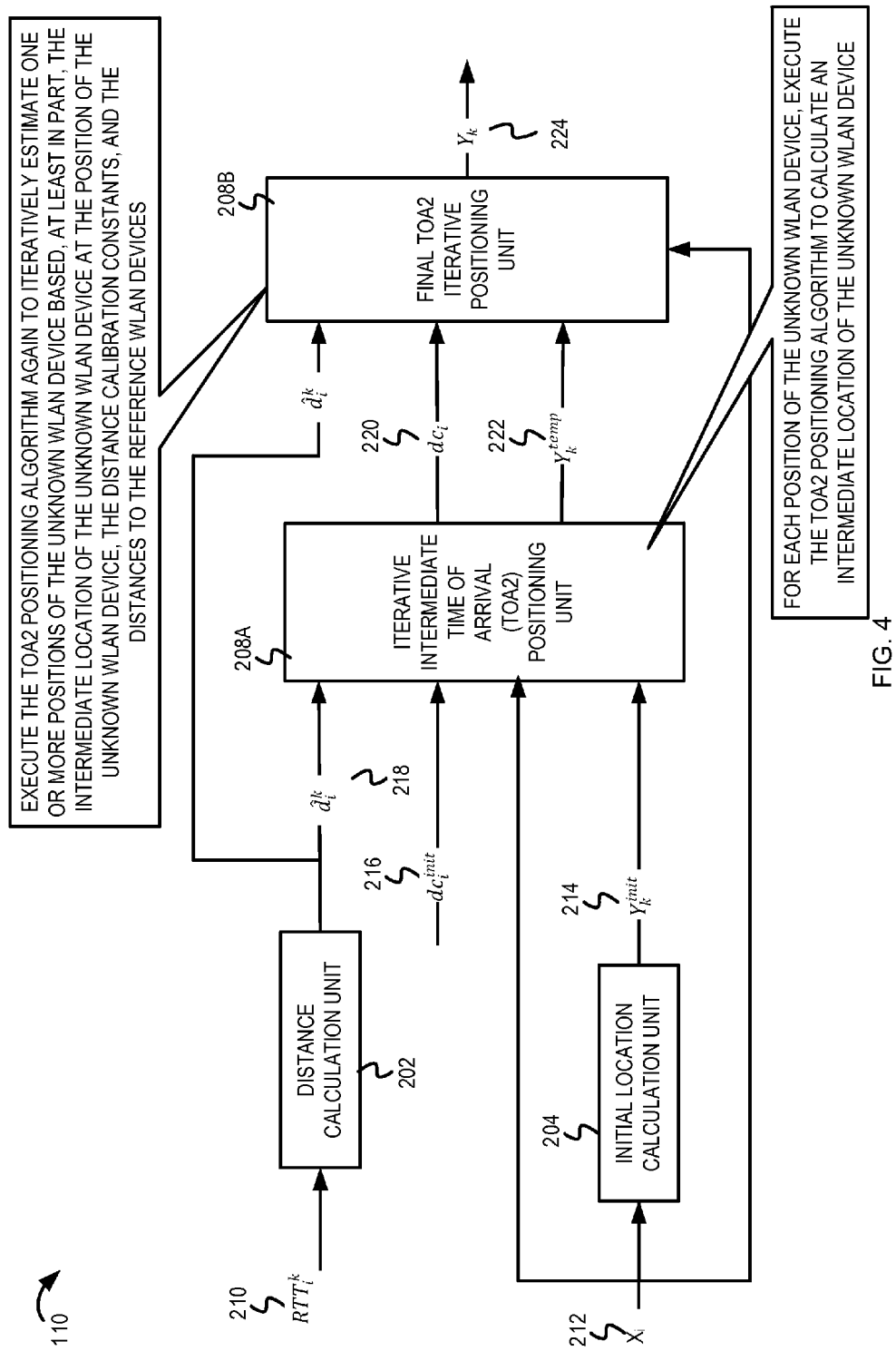
FIG. 4 is an example block diagram of another embodiment of the location calculation unit including a hybrid TOA2-TOA2 positioning mechanism.

FIG. 4 is an example block diagram of another embodiment of the location calculation unit including a hybrid TOA2-TOA2 positioning mechanism. In the example of FIG. 4, the location calculation unit 110 comprises the distance calculation unit 202, the initial location calculation unit 204, and two instances of the TOA2 positioning unit 208 of FIG. 2. For simplicity, the two instances of the TOA2 positioning system will be referred to as "intermediate TOA2 positioning unit 208A" and final TOA2 positioning unit 208B." In FIG. 4, the distance calculation unit 202 and the initial location calculation unit 204 are coupled with the intermediate TOA2 positioning unit 208A. The intermediate TOA2 positioning unit 208A, the distance calculation unit 202, and the initial location calculation unit 204 are coupled with the final TOA2 positioning unit 208B. The distance calculation unit 202 can calculate the distance ($\hat{d}_i^k$) 218 between the unknown WLAN device 102 (at the $k^{th}$ position) and each of the reference WLAN devices 104, 106, 108, and 112 based, at least in part, on the corresponding RTT 210 associated with the reference WLAN devices, as described above in accordance with Eq. 1a of FIG. 2. The initial location calculation unit 204 can calculate the initial location 214 of the unknown WLAN device 102 at the $k^{th}$ position based, at least in part, on the location 212 of each of the reference WLAN devices 104, 106, 108, and 112, as described above in accordance with Eq. 2a or Eq. 2b of FIG. 2. Additionally, in some implementations, the initial location 214 of the unknown WLAN device 102 can be calculated by maximizing the determinant of a product of matrices generated during the execution of the Taylor series based TOA2 positioning algorithm, as depicted in Eq. 33. Maximizing the expression $\det(B_{ToA2,k}^T B_{ToA2,k})$ as depicted in Eq. 33 can ensure that the TOA2 positioning algorithm (described above) converges to a good estimate of the intermediate location of the unknown WLAN device 102. In Eq. 33, $B_{ToA2,k}^T$ represents the transpose of the $B_{ToA2,k}$ matrix and the $B_{ToA2,k}$ matrix was described above with reference to Exp. 22 of FIG. 2.

$$Y_k^{init} = f(X_0, X_1, \ldots X_{N-1}) = \max_{Y_k^{init}} \{\det(B_{ToA2,k}^T B_{ToA2,k})\} \quad \text{Eq. 33}$$

The intermediate TOA2 positioning unit 208A can execute one or more iterations of a Taylor series based TOA2 positioning algorithm to calculate the intermediate location 222 of the unknown WLAN device 102 (at the $k^{th}$ position) and to estimate a distance calibration constant 220 associated with each of the reference WLAN devices, as described above with reference to Eq. 14-23 and Eq. 12-13. After the intermediate TOA2 positioning unit 208A completes the above-described iterative process, the last estimate of the distance calibration constant ("target distance calibration constant") 220 associated with each of the reference WLAN devices can be provided to the final TOA2 positioning unit 208B. Likewise, for each of the M positions of the unknown WLAN device 102, the last estimate of the intermediate location 222 of the unknown WLAN device 102 can be provided to the final TOA2 positioning unit 208B. The final TOA2 positioning unit 208B can then execute operations described above with reference to FIG. 2 and Equations 14-23 to determine one or more of the M positions of the unknown WLAN device 102.

It is noted that although not depicted in the Figures, in some implementations, the TOA1 positioning unit may be employed as both the intermediate location calculation unit and as the final location calculation unit. In another implementation, the TOA1 positioning unit may be employed as the intermediate location calculation unit and the TDOA positioning unit may be employed as the final location calculation unit. It is noted that in other implementations, any suitable location estimation techniques can be employed as the intermediate location calculation unit and as the final location calculation unit. It is also noted that the intermediate location calculation unit is also employed to determine the distance calibration constant associated with each of the reference WLAN devices.

Figure 5:
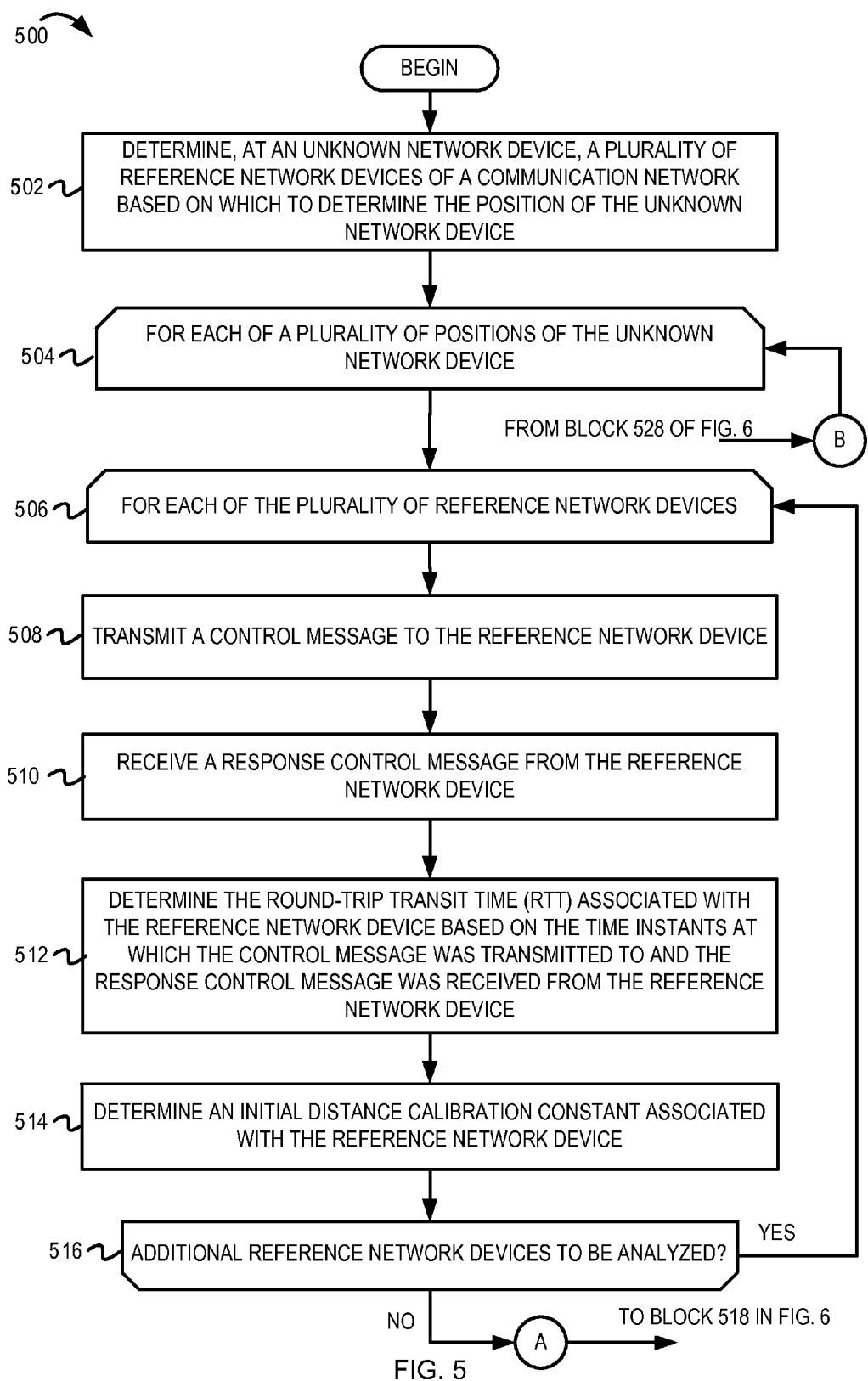
FIG. 5 is a flow diagram illustrating example operations of a hybrid positioning mechanism.
Figure 6:
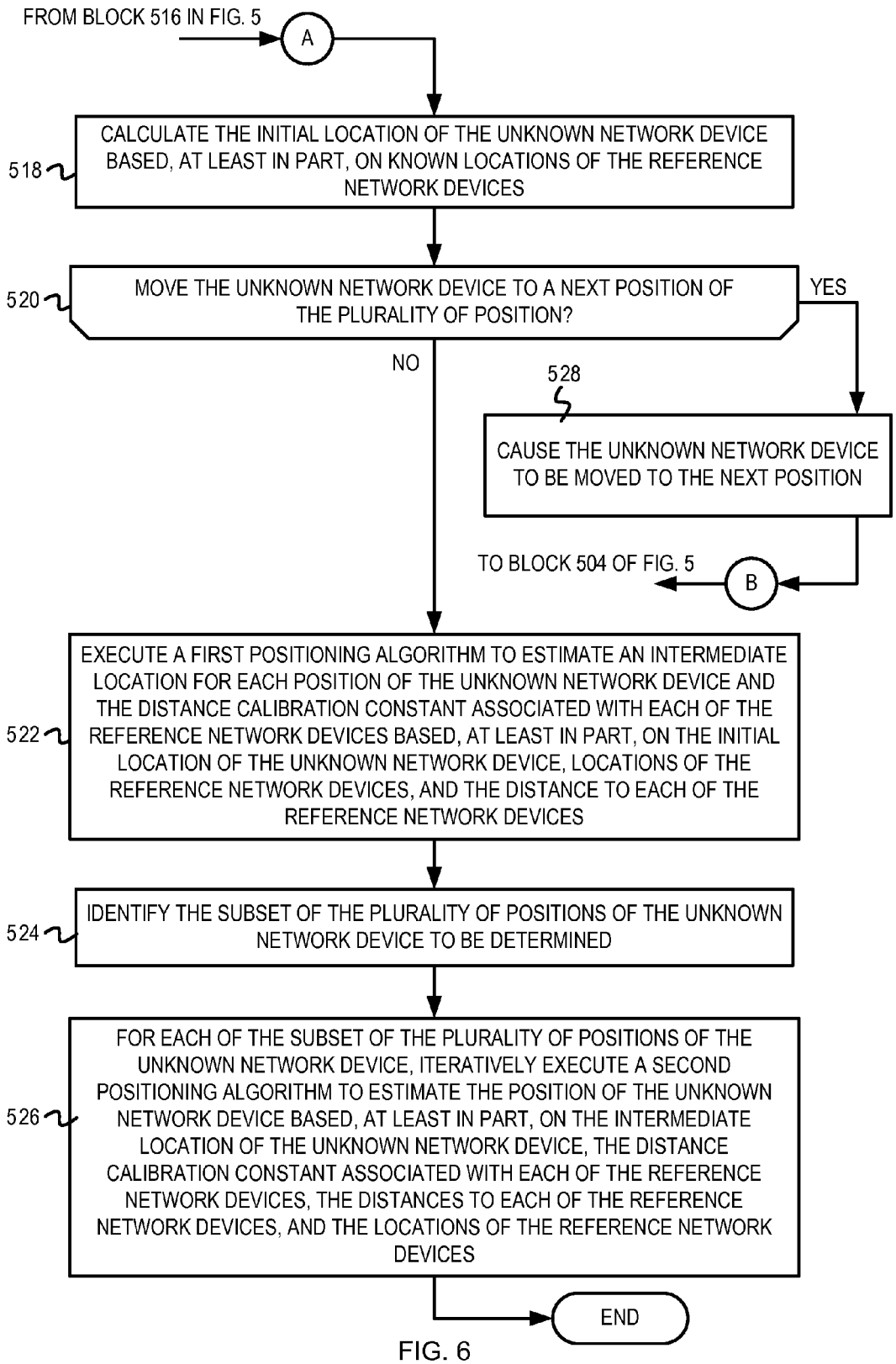
FIG. 6 is a continuation of FIG. 5 and also illustrates example operations of a hybrid positioning mechanism.

FIG. 5 and FIG. 6 depict a flow diagram ("flow") 500 illustrating example operations of a hybrid positioning mechanism. The flow 500 begins at block 502 in FIG. 5.

At block 502, an unknown network device determines a plurality of reference network devices of a communication network based on which to determine the position of the unknown network device. With reference to the example of FIG. 1, the location calculation unit 110 of the unknown WLAN device 102 can identify the reference WLAN devices 104, 106, 108, and 112 based on which to determine the position of the unknown WLAN device 102. In some implementations, the location calculation unit 110 can identify the reference WLAN devices 104, 106, 108, and 112 from a plurality of WLAN devices in the wireless communication network 100 based on analyzing one or more performance measurements associated with the plurality of WLAN devices. For example, location calculation unit 110 can identify N WLAN devices in the wireless communication network 100 with the highest received signal strength indicator (RSSI), the lowest packet error rate (PER), etc. In some implementations, if the wireless communication network 100 comprises a plurality of access points, the access points may advertise (e.g., in a beacon message) their presence/location to other WLAN devices in the wireless communication network 100. The location calculation unit 110 can detect these beacon messages, identify the access points that transmitted the beacon messages, and select at least a subset of the access points as reference WLAN devices (e.g., based on analyzing the performance measurements associated with the beacon messages received from each of the access points). The flow continues at block 504.

At block 504, a loop begins for a plurality of positions of the unknown network device. For example, the location calculation unit 110 can initiate a loop to execute operations described with reference to blocks 506-518 and to determine a set of measurements associated with each position to which the unknown WLAN device 102 will be moved. At each position of the unknown WLAN device 102, the location calculation unit 110 can determine RTT measurements associated with the reference WLAN devices 104, 106, 108, and 112. At each location of the unknown WLAN device 102, the location calculation unit 110 can determine an initial location of the unknown WLAN device 102 and a distance calibration constant associated with each of the reference WLAN devices. As will be further described below, for each location of the unknown WLAN device 102, the location calculation unit 110 can determine an intermediate location of the unknown WLAN device associated with corresponding location of the unknown WLAN device 102. The flow continues at block 506.

At block 506, a loop begins for each of the plurality of reference network devices. For example, the location calculation unit 110 can initiate a loop to determine round trip transit time measurements to each of the reference WLAN devices 104, 106, 108, and 112 as will be further described below in block 508-512. The flow continues at block 508.

At block 508, a control message is transmitted to the reference network device. For example, the location calculation unit 110 can transmit one or more control messages to the reference WLAN device 104. The one or more control messages can comprise an identifier associated with the unknown WLAN device 102, an identifier associated with the reference WLAN device 104, and a suitable payload (e.g., a predetermined combination of symbols, a NULL payload, etc.). The location calculation unit 110 can also record the time instant at which the one or more control messages were transmitted to the reference WLAN device 104. The flow continues at block 510.

At block 510, a response control message is received from the reference network device. For example, the location calculation unit 110 can receive one or more response control messages from the reference WLAN device 104. The one or more response control messages can be WLAN acknowledgment (ACK) messages or any suitable messages that indicate receipt of the control messages (transmitted at block 508) at the reference WLAN device 104. The location calculation unit 110 can also record the time instant at which the one or more response control messages were received at the unknown WLAN device 102. The flow continues at block 512.

At block 512, the round-trip transit time (RTT) associated with the reference network device is determined. In one implementation, the location calculation unit 110 can determine the RTT associated with the reference WLAN device 104 based on the time instants at which the control message was transmitted to the reference WLAN device 104 (recorded at block 508) and the time instant at which the response control message was received from the reference WLAN device 104 (recorded at block 510). The location calculation unit 110 can compute the RTT associated with the reference WLAN device 104 by subtracting the time instant at which the control message was transmitted from the time instant at which the response control message was received. It is noted that in other implementations, the location calculation unit 110 can employ other suitable techniques to determine the RTT associated with each of the reference WLAN devices at a particular position of the unknown WLAN device 102. The flow continues at block 514.

At block 514, an initial distance calibration constant associated with the reference network device is determined. For example, the location calculation unit 110 can determine the initial distance calibration constant associated with the reference WLAN device 104. In some implementations, the initial distance calibration constant may be zero. In another implementation, the initial distance calibration constant may be a randomly selected value. In another implementation, the initial distance calibration constant may be another suitable value selected based on historical analysis of the reference WLAN device. The flow continues at block 516.

At block 516, it is determined whether additional reference network devices are to be analyzed. For example, the location calculation unit 110 can determine whether there are additional reference WLAN devices to be analyzed. If it is determined that additional reference WLAN devices are to be analyzed, the flow loops back to block 506, where the location calculation unit 110 can identify the next reference WLAN device and determine the RTT and the initial distance calibration constant associated with the next reference WLAN device. After all the reference WLAN devices have been analyzed, the flow continues at block 518 in FIG. 6.

At block 518, the initial location of the unknown network device is calculated based, at least in part, on known locations of the reference network devices. For example, location calculation unit 110 (e.g., the initial location calculation unit 204 of FIGS. 2 and 3) can calculate the initial location of the unknown WLAN device 102. As described above with reference to Eq. 2a, the initial location of the unknown WLAN device 102 can be calculated as a function of the location of the reference WLAN devices. In some examples, as described above in Eq. 2b, the initial location of the unknown WLAN device 102 can be calculated as an average of the locations of the reference WLAN devices. In other examples, as described above in Eq. 2c, the initial location of the unknown WLAN device 102 can be calculated as another suitable weighted (or non-weighted) combination of the locations of the reference WLAN devices. More specifically, with reference to Eq. 2c and Eq. 8 of FIG. 2, a TDOA coefficient matrix ($B_{TDoA,k}$) can be calculated as the product of a TDOA distance error matrix (A and the inverse of the transpose of a TDOA location error matrix ($\Delta Y_{TDoA,k}$). In other words, the location calculation unit 110 can determine the TDOA location error matrix ($\Delta Y_{TDOA,k}^{T}$) such that each element of the TDOA location error matrix represents the difference between a coordinate of the estimated location of the unknown WLAN device (e.g., the estimated X-coordinate) and an initial location coordinate of the initial location of the unknown WLAN device 102 (e.g., the X-coordinate of the initial location of the unknown WLAN device 102). The location calculation unit 110 can calculate the TDOA distance error matrix ($A_{TDoA,k}$) in accordance with Exp. 9b. The location calculation unit 110 can then calculate the TDOA coefficient matrix ($B_{TDoA,k}$) as, $B_{TDoA,k} = A_{TDoA,k}(\Delta Y_{TDOA,k}^{T})^{-1}$. The location calculation unit 110 can calculate the initial location of the wireless network device based, at least in part, on maximizing the determinant of the product of the $B_{TDoA,k}$ matrix and a transpose of the $B_{TDoA,k}$ matrix, as depicted in Eq. 2b. The flow continues at block 520.

At block 520, it is determined whether the unknown network device should be moved to a next position of the plurality of positions. For example, the location calculation unit 110 can determine whether the unknown WLAN device 102 should be moved based on the number of reference WLAN devices in the wireless communication network 100, the number of positions to which the unknown WLAN device 102 was previously moved, desired accuracy of the estimated location of the unknown WLAN device 102, etc. For example, if the wireless communication network 100 comprises four reference WLAN devices, the location calculation unit 110 may determine that the unknown WLAN device 102 should be moved at least 5 times (to 5 different positions) to determine an appropriate number of equations to estimate the distance calibration constants associated with each of the reference WLAN devices and to estimate the intermediate location of the unknown WLAN device 102. If it is determined that the unknown network device should be moved to another position, the flow continues at block 528. Otherwise, the flow continues at block 522.

At block 528, the unknown network device is moved to the next position of the plurality of positions. In some implementations, the location calculation unit 110 can prompt the user to move the unknown WLAN device 102 to the next position. The location calculation unit 110 can also indicate a minimum distance (and/or height, angular separation, etc.) between the two consecutive positions. For example, the location calculation unit 110 may indicate that the next position should be at least 5 meters apart from the previous position. In another implementation, the location calculation unit 110 can direct the unknown WLAN device 102 to automatically move to the next position. For example, the location calculation unit 110 can transmit signals to one or more mechanical components of the unknown WLAN device (e.g., sensors, motors, wheels, etc.) to cause the unknown WLAN device 102 to be moved a specified distance from the previous position. After the unknown WLAN device is moved to the next position, the flow continues at block 504, where the operations described above with reference to blocks 506-518 are executed when the unknown WLAN device is at the next position.

At block 522, a first positioning algorithm is executed to estimate an intermediate location for each position of the unknown network device and to determine the distance calibration constants associated with each of the reference network devices based, at least in part, on the initial location of the unknown network device, locations of the reference network devices, and the distance to each of the reference network devices. In one implementation, as described above in FIG. 2, the location calculation unit 110 (e.g., the TDOA positioning unit 206 of FIG. 2) can execute Eq. 5-Eq. 11 to determine a first estimate of the intermediate location 222 (for each of the positions) of the unknown WLAN device. In another implementation, as described above in FIG. 3, the location calculation unit 110 (e.g., the TOA1 positioning unit 302 of FIG. 3) can execute Eq. 24-Eq. 32 to determine the first estimate of the intermediate location 222 (for each of the positions) of the unknown WLAN device 102. The location calculation unit 110 can also determine, for each of the reference WLAN devices, a first estimate of the distance calibration constant 220 based on the distance 218 to the reference WLAN device and the first estimate of the intermediate location 222 of the unknown WLAN device (at each position), as described above in accordance with Eq. 12 and 13. The location calculation unit 110 can iteratively execute the first positioning algorithm for determining estimates of the intermediate location 222 (at each position) of the unknown WLAN device 102 and for determining estimates of the distance calibration constant 220 for each of the reference WLAN devices. The location calculation unit 110 can execute the first positioning algorithm until the error between successive estimates of the intermediate location is less than a predetermined location error threshold, the error between successive estimates of the distance calibration constant is less than a distance calibration error threshold, and/or a predetermined number of iterations have been executed. The last estimate of the distance calibration constant 220 associated with each of the reference WLAN devices and the last estimate of the intermediate location 222 of the unknown WLAN device (for all of the positions of the unknown WLAN device 102) can be used to determine a more accurate estimate of one or more of the positions of the unknown WLAN device 102 as will be described below. It is noted that in other embodiments, the location calculation unit 110 can execute other suitable techniques to determine the intermediate location of the unknown WLAN device 102 at each position of the unknown WLAN device 102 and/or to determine the distance calibration constant associated with each of the reference WLAN devices. The flow continues at block 524.

At block 524, the unknown network device identifies a subset of the plurality of positions of the unknown network device that are to be determined. For example, the location calculation unit 110 can identify which of the positions of the unknown WLAN device 102 should be determined. As described above, when configured in a tracking operating mode, the location calculation unit 110 may determine that the current position and all of the previous positions of the unknown WLAN device 102 should be determined. When configured in a real-time mode, the location calculation unit 110 may determine that only the current position of the unknown WLAN device 102 should be determined. The flow continues at block 526.

At block 526, for each of the subset of the plurality of positions of the unknown network device, a second positioning algorithm is iteratively executed to estimate the position of the unknown network device based, at least in part, on the intermediate location of the unknown network device, the distance calibration constant associated with each of the reference network devices, the distances to each of the reference network devices, and the locations of the reference network devices. For example, the location calculation unit 110 (e.g., the TOA positioning unit 208 of FIG. 2 or of FIG. 3) can execute the TOA positioning algorithm in accordance with Eq. 14-Eq. 23 to estimate each position of the identified subset of positions of the unknown WLAN device 102. From block 526, the flow ends.

It is noted that although FIG. 5-6 depicts multiple loops (beginning at block 504 and block 506) being executed to determine measurements associated with each of the reference WLAN devices at each position to which the unknown WLAN device is moved, embodiments are not so limited. In other embodiments, one or more of the operations of FIGS. 5-6 can be performed concurrently. For example, at each position of the unknown WLAN device 102, the control message can be broadcast to all of the reference WLAN devices. The received response messages can be analyzed concurrently to determine the RTT associated with each of the reference WLAN devices. Also, in some implementations, the initial distance calibration constant associated with each of the reference WLAN devices may be only determined once (e.g., prior to initiating or after terminating the loops beginning at blocks 504 and 506). Also, in some embodiments (as described in FIG. 6), the initial location of the unknown WLAN device 102 can be determined for each position to which the unknown WLAN device 102 is moved. In other embodiments, the initial location of the unknown WLAN device 102 can be assumed to be the same at all the positions of the unknown WLAN device and may be determined only once.

It should be understood that FIGS. 1-6 are examples meant to aid in understanding embodiments and should not be used to limit embodiments or limit scope of the claims. Embodiments may perform additional operations, fewer operations, operations in a different order, operations in parallel, and some operations differently. Although the Figures refer to the unknown WLAN device 102 executing the hybrid TDOA-TOA positioning technique or the hybrid TOA1-TOA2 positioning technique described herein to determine the position of the unknown WLAN device 102, embodiments are not so limited. In other embodiments, functionality for determining the position of the unknown WLAN device 102 can be executed on one or more other suitable electronic devices. In some implementations, one or more of the reference WLAN devices, a centralized server, and/or another suitable electronic device can execute some/all of the operations for determining the position of the unknown WLAN device 102. For example, the unknown WLAN device 102 can determine the RTT associated with each of the reference WLAN devices 102, 106, 108, and 112 and can provide the RTT values to the centralized server (or another device to which the processing has been offloaded). The centralized server can then calculate the distance calibration constant associated with each of the reference WLAN devices, the intermediate location of the unknown WLAN device at each position to which the unknown WLAN device is moved, and one or more of the positions of the unknown WLAN device 102. The centralized server can then communicate the calculated position(s) to the unknown WLAN device 102.

It is noted that in some implementations, the location calculation unit 110 can determine (for each reference WLAN device and at each position of the unknown WLAN device) multiple RTT measurements and multiple distance measurements. For example, at each position of the unknown WLAN device, the location calculation unit 110 can transmit a predetermined number of control messages to the reference WLAN device 104 and can receive a corresponding number of response control messages. Accordingly, the location calculation unit 110 can calculate the predetermined number of RTT measurements associated with the reference WLAN device 104. In some implementations, the location calculation unit 110 can determine and use the average RTT value for subsequent operations. In other implementations, the location calculation unit 110 can determine a distance to the reference WLAN device 104, for each of the RTT measurements and can determine and use the average distance to the reference WLAN device 104 for subsequent operations.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
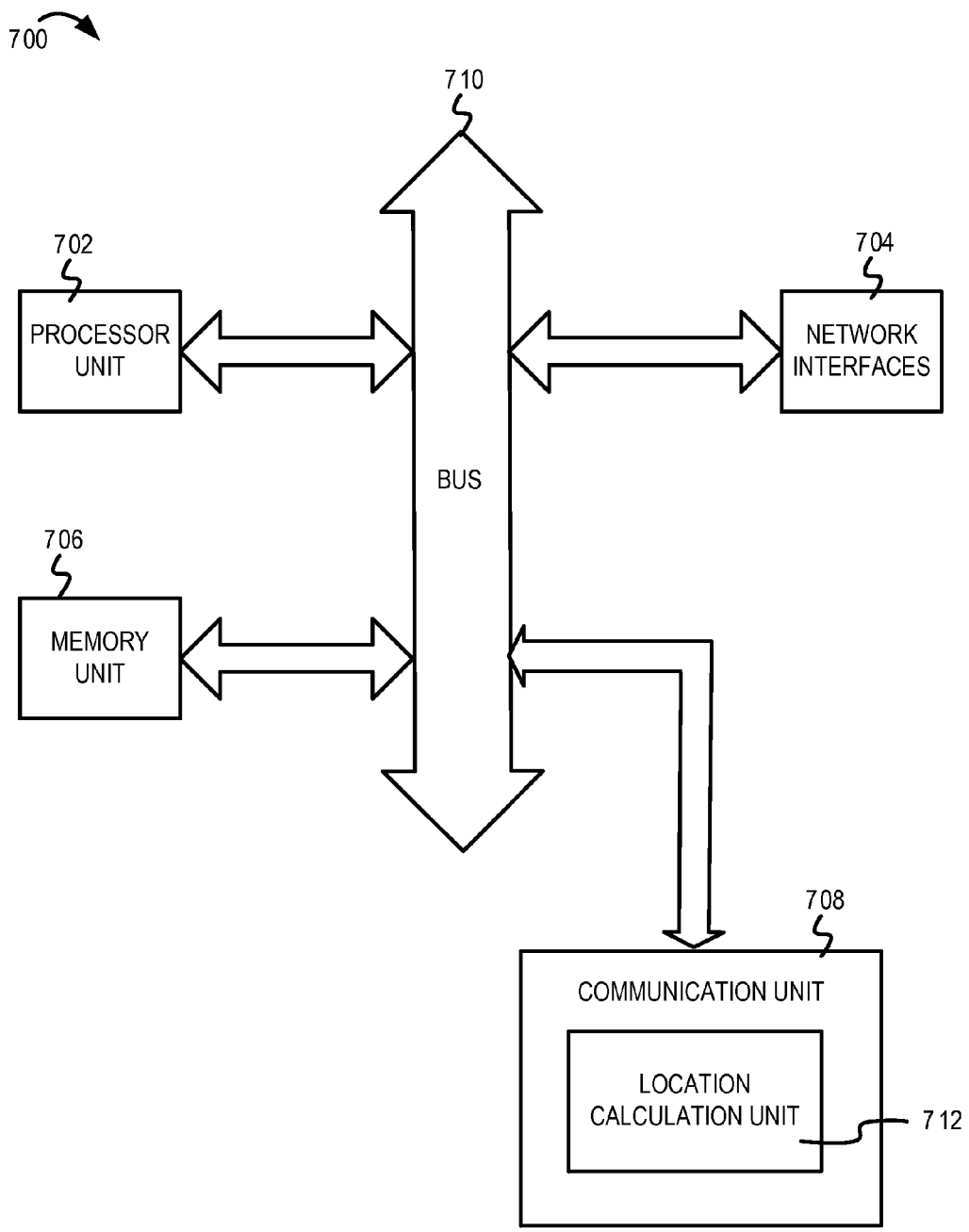
FIG. 7 is a block diagram of one embodiment of an electronic device including a hybrid positioning mechanism for determining the location of the electronic device in a wireless communication network.

FIG. 7 is a block diagram of one embodiment of an electronic device 700 including a hybrid positioning mechanism for determining the location of the electronic device in a wireless communication network. In some implementations, the electronic device 700 may be one of a laptop computer, a tablet computer, a netbook, a mobile phone, a smart appliance, a gaming console, access point, or other electronic systems comprising wireless communication capabilities. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, Infini-Band®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 700 also includes a communication unit 708. The communication unit 708 comprises a location calculation unit 712. As described above with reference to FIGS. 1-6, the location calculation unit 812 can execute one or more iterations of a first positioning algorithm (e.g., a TDOA positioning algorithm as described in FIG. 2, a TOA1 positioning algorithm as described in FIG. 3, or a TOA2 positioning algorithm as described in FIG. 4, etc.) to determine an intermediate location for each position of the electronic device 700 and to determine the distance calibration constant associated with each reference network device based, at least in part, on a calculated initial location of the electronic device 700, the distance to each of the reference network devices, and the location of each of the reference network devices. The location calculation unit 712 can then execute a second positioning algorithm (e.g., a TOA2 positioning algorithm) to determine one or more of the positions of the electronic device 700 by using at least a previously calculated intermediate location of the electronic device 700 and the distance calibration constants associated with the reference network devices. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, a hybrid positioning technique for a wireless communication system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a wireless network device of a communication network, the method comprising:
   determining distances between the wireless network device and a plurality of reference wireless network devices;
   determining an initial position of the wireless network device based, at least in part, on known positions of at least a subset of the plurality of reference wireless network devices;
   determining, by executing a first set of positioning computations associated with time difference of arrival (TDOA), an intermediate position of the wireless network device and distance calibration values associated with the plurality of reference wireless network devices based, at least in part, on the initial position of the wireless network device and the distances between the wireless network device and the plurality of reference wireless network devices; and
   estimating, by executing a second set of positioning computations associated with time of arrival (TOA), a current position of the wireless network device based, at least in part, on the intermediate position of the wireless network device and the distance calibration values associated with the plurality of reference wireless network devices.

2. The method of claim 1, wherein determining the intermediate position of the wireless network device and the distance calibration values associated with the plurality of reference wireless network devices comprises:
   determining a first estimate of the intermediate position of the wireless network device based, at least in part, on the initial position of the wireless network device, the distances between the wireless network device and the plurality of reference wireless network devices, the known positions of at least the subset of the plurality of reference wireless network devices, and an initial distance calibration value associated with at least a first reference wireless network device of the plurality of reference wireless network devices; and
   determining, for the first reference wireless network device, a first estimate of a first distance calibration value associated with the first reference wireless network device based, at least in part, on the first estimate of the intermediate position of the wireless network device, a first distance between the wireless network device and the first reference wireless network device, and a known position of the first reference wireless network device.

3. The method of claim 2, wherein said determining the first estimate of the first distance calibration value associated with the first reference wireless network device comprises:
   determining, for a plurality of positions of the wireless network device, an intermediate distance calibration value associated with the first reference wireless network device when the wireless network device is at one of the plurality of positions, each intermediate distance calibration value based, at least in part, on the first estimate of the intermediate position of the wireless network device, the first distance between the wireless network device and the first reference wireless network device, and the known position of the first reference wireless network device; and
   combining intermediate distance calibration values associated with the plurality of positions of the wireless network device to determine the first estimate of the first distance calibration value associated with the first reference wireless network device.

4. The method of claim 3, wherein said determining the intermediate distance calibration value associated with the first reference wireless network device comprises:
   determining the first distance between the wireless network device and the first reference wireless network device based, at least in part, on a round trip transit time between the wireless network device and the first reference wireless network device;
   determining a second distance between the wireless network device and the first reference wireless network device based, at least in part, on the known position of the first reference wireless network device and the first estimate of the intermediate position of the wireless network device; and
   determining the intermediate distance calibration value associated with the first reference wireless network device as a difference between the first distance and the second distance.

5. The method of claim 2, wherein the initial distance calibration value associated with the first reference wireless network device is one of a zero value, a predetermined value, or a dynamically selected random value.

6. The method of claim 2, further comprising:
   determining a second estimate of the intermediate position of the wireless network device based, at least in part, on the first estimate of the intermediate position of the wireless network device, the distances between the wireless network device and the plurality of reference wireless network devices, the known positions of at least the subset of the plurality of reference wireless network devices, and the first estimate of the first distance calibration value associated with the first reference wireless network device; and determining, for the first reference wireless network device, a second estimate of the first distance calibration value associated with the first reference wireless network device based, at least in part, on the second estimate of the intermediate position of the wireless network device, the first distance between the wireless network device and the first reference wireless network device, and the known position of the first reference wireless network device.

7. The method of claim 1, wherein estimating the current position of the wireless network device comprises:
estimating, by executing a Taylor series based TOA positioning algorithm, the current position of the wireless network device based, at least in part, on the intermediate position of the wireless network device, the distance calibration values associated with the plurality of reference wireless network devices, the known positions of at least the subset of the plurality of reference wireless network devices, and the distances between the wireless network device and the plurality of reference wireless network devices.

8. The method of claim 1, wherein the first set of positioning computations are executed until:
an error between a current estimate of the intermediate position of the wireless network device and a preceding estimate of the intermediate position of the wireless network device is less than a predetermined position error threshold,
an error between current estimates of the distance calibration values associated with the plurality of reference wireless network devices and preceding estimates of the distance calibration values is less than a predetermined distance calibration error threshold, or
a predetermined number of iterations of the first set of positioning computations are executed.

9. The method of claim 1, further comprising:
determining, at the wireless network device, round trip transit times between the wireless network device and the plurality of reference wireless network devices,
wherein the distances between the wireless network device and the plurality of reference wireless network devices are based, at least in part on the round trip transit times between the wireless network device and the plurality of reference wireless network devices.

10. The method of claim 1, wherein said determining the initial position of the wireless network device based, at least in part, on the known positions of at least the subset of the plurality of reference wireless network devices comprises one of:
determining the initial position of the wireless network device as an average of the known positions of at least the subset of the plurality of reference wireless network devices, or
determining the initial position of the wireless network device as a weighted combination of the known positions of at least the subset of the plurality of reference wireless network devices.

11. The method of claim 1, wherein said determining the initial position of the wireless network device comprises:
determining a location error matrix, wherein each element of the location error matrix represents a difference between an estimated position coordinate of the wireless network device and a corresponding initial position coordinate of the initial position of the wireless network device;
determining a distance difference error matrix, wherein each element of the distance difference error matrix represents a difference between a measured distance difference between the wireless network device and a pair of the plurality of reference wireless network devices and an estimated distance difference between the wireless network device and a pair of the plurality of reference wireless network devices, wherein the measured distance difference is determined based, at least in part, on a round trip transit time between the wireless network device and the pair of the plurality of reference wireless network devices, wherein the estimated distance difference is determined based, at least in part, on positions of the pair of the plurality of reference wireless network devices and the initial position of the wireless network device;
determining a coefficient matrix as a product of the distance difference error matrix and an inverse of a transpose of the location error matrix; and
determining the initial position of the wireless network device based, at least in part, on maximizing a determinant of a product of the coefficient matrix and a transpose of the coefficient matrix.

12. The method of claim 1, wherein said determining the initial position of the wireless network device comprises:
determining a location error matrix, wherein each element of the location error matrix represents a difference between an estimated position coordinate of the wireless network device and a corresponding initial position coordinate of the initial position of the wireless network device;
determining a distance error matrix, wherein each element of the distance error matrix represents a difference between a measured distance between the wireless network device and one of the plurality of reference wireless network devices and an estimated distance between the wireless network device and the one of the plurality of reference wireless network devices, wherein the measured distance is determined based, at least in part, on a round trip transit time between the wireless network device and the one of the plurality of reference wireless network devices, wherein the estimated distance is determined based, at least in part, on the known positions of the one of the plurality of reference wireless network devices and the initial position of the wireless network device;
determining a coefficient matrix as a product of the distance error matrix and an inverse of a transpose of the location error matrix; and
determining the initial position of the wireless network device based, at least in part, on maximizing a determinant of a product of the coefficient matrix and a transpose of the coefficient matrix.

13. The method of claim 1, further comprising:
identifying the plurality of reference wireless network devices based, at least in part, on analyzing one or more performance measurements associated with the plurality of reference wireless network devices.

14. The method of claim 1, wherein the wireless network device and the plurality of reference wireless network devices comprise wireless local area network (WLAN) communication capabilities.

15. A wireless network device for use in a communication network, the wireless network device comprising:
a network interface operable to couple the wireless network device to the communication network; and
a position determination unit coupled with the network interface, the position determination unit operable to:

determine distances between the wireless network device and a plurality of reference wireless network devices;

determine an initial position of the wireless network device based, at least in part, on known positions of at least a subset of the plurality of reference wireless network devices;

determine, by executing a first set of positioning computations associated with time difference of arrival (TDOA), an intermediate position of the wireless network device and distance calibration values associated with the plurality of reference wireless network devices based, at least in part, on the initial position of the wireless network device and the distances between the wireless network device and the plurality of reference wireless network devices; and estimate, by executing a second set of positioning computations associated with time of arrival (TOA), a current position of the wireless network device based, at least in part, on the intermediate position of the wireless network device and the distance calibration values associated with the plurality of reference wireless network devices.

16. The wireless network device of claim 15, wherein the position determination unit operable to determine the intermediate position of the wireless network device and the distance calibration values associated with the plurality of reference wireless network devices comprises the position determination unit operable to:

determine a first estimate of the intermediate position of the wireless network device based, at least in part, on the initial position of the wireless network device, the distances between the wireless network device and the plurality of reference wireless network devices, the known positions of at least the subset of the plurality of reference wireless network devices, and an initial distance calibration value associated with at least a first reference wireless network device of the plurality of reference wireless network devices; and determine, for the first reference wireless network device, a first estimate of a first distance calibration value associated with the first reference wireless network device based, at least in part, on the first estimate of the intermediate position of the wireless network device, a first distance between the wireless network device and the first reference wireless network device, and a known position of the first reference wireless network device.

17. The wireless network device of claim 16, wherein the position determination unit operable to determine the first estimate of the first distance calibration value associated with the first reference wireless network device comprises the position determination unit operable to:

determine, for a plurality of positions of the wireless network device, an intermediate distance calibration value associated with the first reference wireless network device when the wireless network device is at one of the plurality of positions, each intermediate distance calibration value based, at least in part, on the first estimate of the intermediate position of the wireless network device, the first distance between the wireless network device and the first reference wireless network device, and the known position of the first reference wireless network device; and combine intermediate distance calibration values associated with the plurality of positions of the wireless network device to determine the first estimate of the first distance calibration value associated with the first reference wireless network device.

18. The wireless network device of claim 17, wherein the position determination unit operable to determine the intermediate distance calibration value associated with the first reference wireless network device comprises the position determination unit operable to:

determine the first distance between the wireless network device and the first reference wireless network device based, at least in part, on a round trip transit time between the wireless network device and the first reference wireless network device;

determine a second distance between the wireless network device and the first reference wireless network device based, at least in part, on the known position of the first reference wireless network device and the first estimate of the intermediate position of the wireless network device; and determine the intermediate distance calibration value associated with the first reference wireless network device as a difference between the first distance and the second distance.

19. The wireless network device of claim 16, wherein the position determination unit operable to estimate the current position of the wireless network device comprises the position determination unit operable to:

estimate, by executing a Taylor series based TOA positioning algorithm, the current position of the wireless network device based, at least in part, on the intermediate position of the wireless network device, the distance calibration values associated with the plurality of reference wireless network devices, the known positions of at least the subset of the plurality of reference wireless network devices, and the distances between the wireless network device and the plurality of reference wireless network devices.

20. A non-transitory machine-readable media having instructions stored therein, which when executed by one or more processors of a wireless network device causes the wireless network device to perform operations that comprise:

determining distances between the wireless network device and a plurality of reference wireless network devices;

determining an initial position of the wireless network device based, at least in part, on known positions of at least a subset of the plurality of reference wireless network devices;

determining, by executing a first set of positioning computations associated with time difference of arrival (TDOA), an intermediate position of the wireless network device and distance calibration values associated with the plurality of reference wireless network devices based, at least in part, on the initial position of the wireless network device and the distances between the wireless network device and the plurality of reference wireless network devices; and estimating, by executing a second set of positioning computations associated with time of arrival (TOA), a current position of the wireless network device based, at least in part, on the intermediate position of the wireless network device and the distance calibration values associated with the plurality of reference wireless network devices.

21. The non-transitory machine-readable media of claim 20, wherein said determining the intermediate position of the wireless network device and the distance calibration values associated with the plurality of reference wireless network devices comprises:
  determining a first estimate of the intermediate position of the wireless network device based, at least in part, on the initial position of the wireless network device, the distances between the wireless network device and the plurality of reference wireless network devices, the known positions of at least the subset of the plurality of reference wireless network devices, and an initial distance calibration value associated with at least a first reference wireless network device of the plurality of reference wireless network devices; and
  determining, for the first reference wireless network device, a first estimate of a first distance calibration value associated with the first reference wireless network device based, at least in part, on the first estimate of the intermediate position of the wireless network device, a first distance between the wireless network device and the first reference wireless network device, and a known position of the first reference wireless network device; and
wherein said operation of estimating the current position of the wireless network device comprises:
  estimating, by executing a Taylor series based TOA positioning algorithm, the current position of the wireless network device based, at least in part, on the intermediate position of the wireless network device, the distance calibration values associated with the plurality of reference wireless network devices, the known positions of at least the subset of the plurality of reference wireless network devices, and the distances between the wireless network device and the plurality of reference wireless network devices.

22. The non-transitory machine-readable media of claim 21, wherein said operation of determining the first estimate of the first distance calibration value associated with the first reference wireless network device comprises:
  determining the first distance between the wireless network device and the first reference wireless network device based, at least in part, on a round trip transit time between the wireless network device and the first reference wireless network device;
  determining a second distance between the wireless network device and the first reference wireless network device based, at least in part, on the known position of the first reference wireless network device and the first estimate of the intermediate position of the wireless network device;
  determining an intermediate distance calibration value associated with the first reference wireless network device as a difference between the first distance and the second distance; and
  combining intermediate distance calibration values associated with a plurality of positions of the wireless network device to determine the first estimate of the first distance calibration value associated with the first reference wireless network device.

* * * * *